US012487080B2

(12) United States Patent
Liu et al.

(10) Patent No.: US 12,487,080 B2
(45) Date of Patent: Dec. 2, 2025

(54) SYSTEMS AND METHODS FOR OBJECT MEASUREMENT

(71) Applicant: ZHEJIANG HUARAY TECHNOLOGY CO., LTD., Zhejiang (CN)

(72) Inventors: Yu Liu, Hangzhou (CN); Yunke Zhou, Hangzhou (CN); Lu Zhou, Hangzhou (CN)

(73) Assignee: ZHEJIANG HUARAY TECHNOLOGY CO., LTD., Hangzhou (CN)

( * ) Notice: Subject to any disclaimer, the term of this patent is extended or adjusted under 35 U.S.C. 154(b) by 514 days.

(21) Appl. No.: 18/057,221

(22) Filed: Nov. 20, 2022

(65) Prior Publication Data

US 2023/0084728 A1 Mar. 16, 2023

Related U.S. Application Data

(63) Continuation of application No. PCT/CN2021/086557, filed on Apr. 12, 2021.

(30) Foreign Application Priority Data

Jun. 19, 2020 (CN) .......................... 202010563722.3

(51) Int. Cl.
*G01B 11/25* (2006.01)
*G01B 11/00* (2006.01)
*G06T 7/80* (2017.01)

(52) U.S. Cl.
CPC .......... *G01B 11/254* (2013.01); *G01B 11/002* (2013.01); *G01B 11/2504* (2013.01); *G06T 7/80* (2017.01); *G06T 2207/30244* (2013.01)

(58) Field of Classification Search
CPC . G01B 11/254; G01B 11/002; G01B 11/2504; G06T 7/80; G06T 7/521
See application file for complete search history.

(56) References Cited

U.S. PATENT DOCUMENTS

2005/0046873 A1* 3/2005 Suzuki .................... G06T 7/521
356/605
2005/0162420 A1 7/2005 Ban et al.
(Continued)

FOREIGN PATENT DOCUMENTS

CA 3022442 A1 1/2019
CN 101887585 A 11/2010
(Continued)

OTHER PUBLICATIONS

International Search Report in PCT/CN2021/086557 mailed on Jul. 7, 2021, 5 pages.
(Continued)

*Primary Examiner* — Molly Wilburn
(74) *Attorney, Agent, or Firm* — METIS IP LLC

(57) ABSTRACT

The present disclosure relates to systems and methods for object measurement. The systems may obtain an image of an object with a light bar acquired by an imaging device. The light bar may be formed by an optical sensor irradiating the object with a light beam. The systems may obtain a measurement model. The measurement model may be configured to simulate a curved surface formed by the light beam. The systems may determine position information of at least a portion of the object based at least in part on the image of the object with the light bar and the measurement model.

19 Claims, 11 Drawing Sheets

(56) References Cited

U.S. PATENT DOCUMENTS

| | | | | |
|---|---|---|---|---|
| 2008/0201101 | A1* | 8/2008 | Hebert | G06T 7/521 |
| | | | | 702/152 |
| 2014/0347473 | A1* | 11/2014 | Wolff | G06T 5/77 |
| | | | | 348/135 |
| 2015/0260507 | A1 | 9/2015 | Aramaki | |
| 2020/0132450 | A1* | 4/2020 | Grzesiak | G01B 5/008 |

FOREIGN PATENT DOCUMENTS

| | | |
|---|---|---|
| CN | 103499302 A | 1/2014 |
| CN | 103759871 | 4/2014 |
| CN | 105841841 A | 8/2016 |
| CN | 106441099 | 2/2017 |
| CN | 106705849 | 5/2017 |
| CN | 106949851 | 7/2017 |
| CN | 107578464 | 1/2018 |
| CN | 108458671 | 8/2018 |
| CN | 108662987 | 10/2018 |
| CN | 108981604 | 12/2018 |
| CN | 108981608 A | 12/2018 |
| CN | 109443214 | 3/2019 |
| CN | 109945792 | 6/2019 |
| CN | 110111424 | 8/2019 |
| CN | 110207614 | 9/2019 |
| CN | 110244320 | 9/2019 |
| CN | 110470320 A | 11/2019 |
| CN | 110599541 | 12/2019 |
| CN | 110689581 | 1/2020 |
| CN | 110702009 | 1/2020 |
| CN | 111272102 | 6/2020 |
| WO | 2021253940 | 12/2021 |

OTHER PUBLICATIONS

Written Opinion in PCT/CN2021/086557 mailed on Jul. 7, 2021, 5 pages.
First Office Action in Chinese Application No. 202010563722.3 mailed on Jul. 2, 2021, 17 pages.
The Extended European Search Report in European Application No. 21826983.5 mailed on Sep. 15, 2023, 7 pages.
Decision of Patent Grant in Korean Application No. 10-2022-7045481 mailed on Apr. 7, 2025, 24 pages.

\* cited by examiner

SYSTEMS AND METHODS FOR OBJECT MEASUREMENT

CROSS-REFERENCE TO RELATED APPLICATIONS

This application is a Continuation of International Application No. PCT/CN2021/086557 filed on Apr. 12, 2021, which claims priority to Chinese Patent Application No. 202010563722.3 filed on Jun. 19, 2020, the contents of each of which are incorporated herein by reference in their entirety.

TECHNICAL FIELD

The present disclosure generally relates to machine vision technology, and in particular, to systems and methods for object measurement.

BACKGROUND

With the development of machine vision technology, the exploration of object measurement has developed rapidly nowadays. A laser technology is widely used for object measurement. Commonly, using the laser technique, an object measurement system may measure an object (e.g., an industrial component) based on a laser beam emitted by a laser transmitter to the object. And a plane model may be used to simulate a plane formed by the laser beam, which may be not applicable for a curved surface formed by the laser beam, thereby decreasing the measurement accuracy of object measurement based on the plane model. Therefore, it is desirable to provide systems and methods for object measurement with improved measurement accuracy.

SUMMARY

An aspect of the present disclosure relates to a system for object measurement. The system may include at least one storage medium including a set of instructions and at least one processor in communication with the at least one storage medium. When executing the set of instructions, the at least one processor may be directed to cause the system to implement operations. The operations may include obtaining an image of an object with a light bar acquired by an imaging device. The light bar may be formed by an optical sensor irradiating the object with a light beam. The operations may include obtaining a measurement model. The measurement model may be configured to simulate a curved surface formed by the light beam. The operations may further include determining position information of at least a portion of the object based at least in part on the image of the object with the light bar and the measurement model.

In some embodiments, the measurement model may be obtained via operations. The operations may include obtaining a plurality of first calibration images of a calibration object acquired by the imaging device. Each of the plurality of first calibration images may have a light bar formed on the calibration object by the optical sensor. The operations may include, for each of the plurality of first calibration images, determining a center point of a light bar in the first calibration image. The operations may further include obtaining a preliminary measurement model and obtaining the measurement model by calibrating the preliminary measurement model based on a plurality of center points corresponding to the plurality of first calibration images.

In some embodiments, the determining the center point of the light bar in the first calibration image may include converting the first calibration image into a grayscale image; determining a pixel set including a plurality of pixels in the grayscale image based on grayscale values of pixels in the grayscale image; determining a target pixel by analyzing the pixel set; and designating the target pixel as the center point of the light bar in the first calibration image.

In some embodiments, the determining the center point of the light bar in the first calibration image may include determining a normal vector of the center point of the light bar in the first calibration image based on a pixel set including a plurality of pixels in a grayscale image corresponding to the first calibration image, and determining the center point of the light bar in the first calibration image based on the normal vector.

In some embodiments, the determining the normal vector of the center point of the light bar in the first calibration image based on the pixel set may include, for each of the plurality of pixels in the pixel set, determining a covariance matrix based on position information of the pixel in a pixel coordinate system of the first calibration image and obtaining an eigenvalue and an eigenvector of the covariance matrix; determining the normal vector of the center point of the light bar in the first calibration image based on a plurality of eigenvalues and eigenvectors of a plurality of covariance matrixes corresponding to the plurality of the pixels in the pixel set.

In some embodiments, the determining the center point of the light bar in the first calibration image based on the normal vector may include determining at least two reference pixels from the pixel set based on the normal vector and determining the center point of the light bar in the first calibration image based on the at least two reference pixels in the first calibration image.

In some embodiments, the obtaining the measurement model by calibrating the preliminary measurement model based on the plurality of center points corresponding to the plurality of first calibration images may include determining position information of the plurality of center points in a world coordinate system and obtaining the measurement model by calibrating the preliminary measurement model based on the position information of the plurality of center points in the world coordinate system.

In some embodiments, the obtaining the measurement model by calibrating the preliminary measurement model based on the plurality of center points corresponding to the plurality of first calibration images may include transforming position information of the plurality of center points from a world coordinate system to a camera coordinate system of the imaging device and obtaining the measurement model by calibrating the preliminary measurement model based on the position information of the plurality of center points in the camera coordinate system.

In some embodiments, the obtaining the measurement model by calibrating the preliminary measurement model based on the plurality of center points corresponding to the plurality of first calibration images may include updating, based on the plurality of center points, preliminary values of a plurality of parameters of the preliminary measurement model.

In some embodiments, the imaging device is calibrated via operations. The operations may include obtaining a plurality of second calibration images of a calibration object acquired by the imaging device. The operations may include, for each of the plurality of second calibration images, extracting at least one feature point from the second calibration image. The operations may further include obtaining feature information of the calibration object in a world coordinate system and calibrating the imaging device based on the feature information of the calibration object in the world coordinate system and a plurality of feature points corresponding to the plurality of second calibration images.

In some embodiments, the determining, based on the image of the object with the light bar and the measurement model the position information of at least a portion of the object may include obtaining an imaging model of the imaging device, the imaging model indicating a transform relationship between coordinate systems associated with the imaging device, and determining the position information of at least a portion of the object based on the image of the object with the light bar, the imaging model, and the measurement model.

In some embodiments, the determining the position information of at least a portion of the object based on the image of the object with the light bar, the imaging model, and the measurement model may include determining a center point of the light bar in the image of the object; obtaining, from the imaging model of the imaging device, a ray equation corresponding to the center point of the light bar in the image of the object; and determining, based on the ray equation and the surface equation of the measurement model, coordinates of a point representing the at least a portion of the object.

In some embodiments, the surface equation may include at least one of a freeform surface equation that simulates a freeform surface or a polynomial equation that simulates an elementary analytic surface.

A further aspect of the present disclosure relates to a method for object measurement. The method may be implemented on a computing device including at least one processor, at least one storage medium, and a communication platform connected to a network. The method may include obtaining an image of an object with a light bar acquired by an imaging device. The light bar may be formed by an optical sensor irradiating the object with a light beam. The method may include obtaining a measurement model. The measurement model may be configured to simulate a curved surface formed by the light beam. The method may further include determining position information of at least a portion of the object based at least in part on the image of the object with the light bar and the measurement model.

A still further aspect of the present disclosure relates to a non-transitory computer readable medium including executable instructions. When the executable instructions are executed by at least one processor, the executable instructions may direct the at least one processor to perform a method. The method may include obtaining an image of an object with a light bar acquired by an imaging device. The light bar may be formed by an optical sensor irradiating the object with a light beam. The method may include obtaining a measurement model. The measurement model may be configured to simulate a curved surface formed by the light beam. The method may further include determining position information of at least a portion of the object based at least in part on the image of the object with the light bar and the measurement model.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
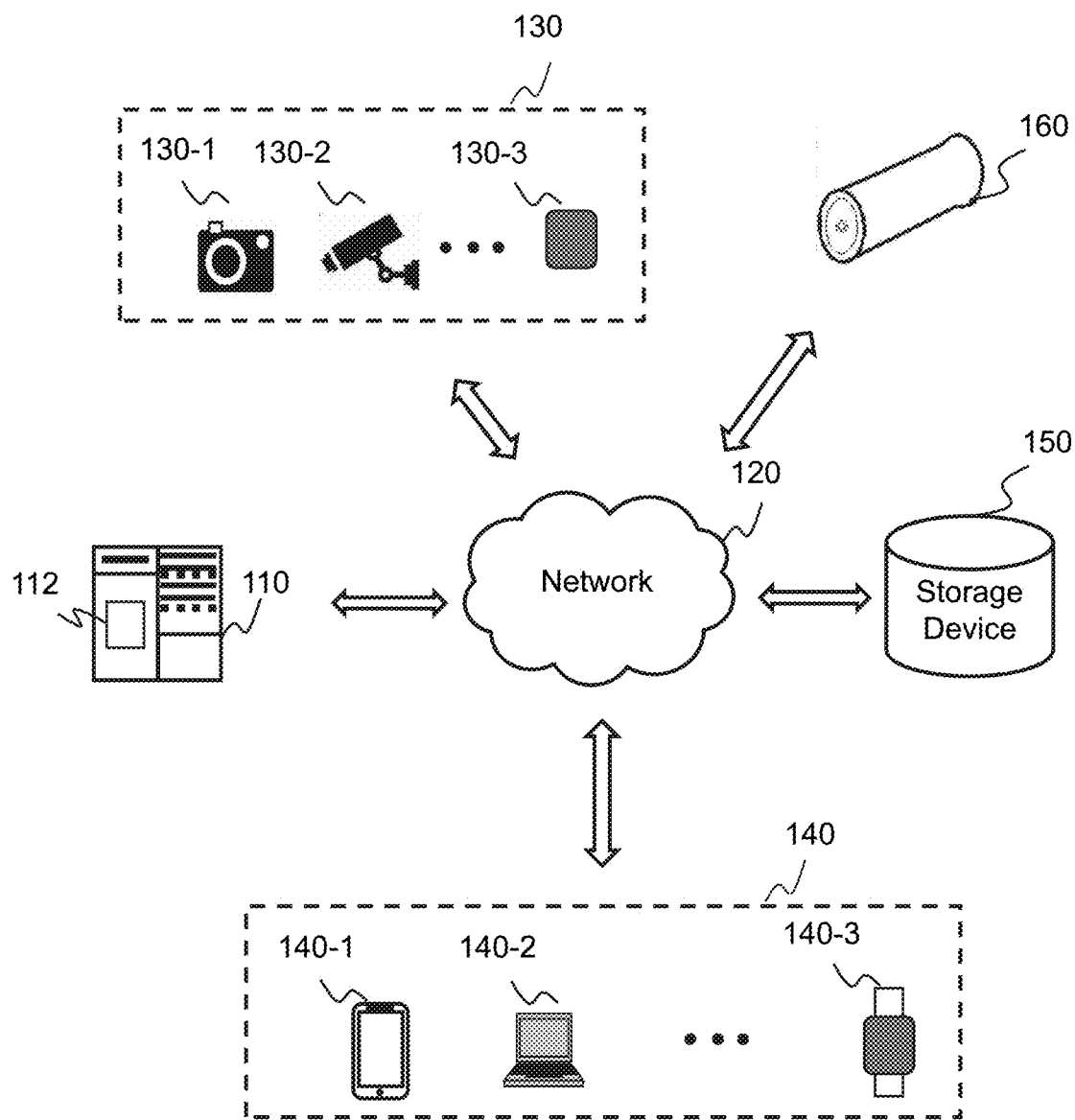
FIG. 1 is a schematic diagram illustrating an exemplary object measurement system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expression if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to systems and methods for object measurement. An optical sensor (e.g., a laser transmitter) may irradiate an object via emitting a light beam toward the object (e.g., an industrial component), and the light beam may form a light bar on the object. An imaging device (e.g., a camera, a video recorder) may capture an image of the object with the light bar. The systems and methods may obtain the image of the object with the light bar from the imaging device. Further, the systems and methods may obtain a measurement model (also referred to as a curved surface model). The measurement model may be configured to simulate a curved surface formed by the light beam. The systems and methods may determine position information of at least a portion of the object based at least in part on the image of the object with the light bar and the measurement model. For example, the systems and methods may determine coordinates of a point representing the at least a portion of the object in a world coordinate system or a camera coordinate system of the imaging device.

According to the systems and methods of the present disclosure, the measurement model that can simulate the curved surface is used for object measurement, which may improve the measurement accuracy of the object measurement.

FIG. 1 is a schematic diagram illustrating an exemplary object measurement system according to some embodiments of the present disclosure. As shown, the object measurement system 100 may include a server 110, a network 120, an imaging device 130, a user device 140, a storage device 150, and an optical sensor 160.

The server 110 may be a single server or a server group. The server group may be centralized or distributed (e.g., the server 110 may be a distributed system). In some embodiments, the server 110 may be local or remote. For example, the server 110 may access information and/or data stored in the imaging device 130, the user device 140, and/or the storage device 150 via the network 120. As another example, the server 110 may be directly connected to the imaging device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to object measurement to perform one or more functions described in the present disclosure. For example, the processing device 112 may obtain an image of an object with a light bar acquired by the imaging device 130. The processing device 112 may obtain a measurement model. Further, the processing device 112 may determine position information of at least a portion of the object based at least in part on the image of the object with the light bar and the measurement model. As another example, the processing device 112 may obtain the measurement model by calibrating a preliminary measurement model. As a further example, the processing device 112 may calibrate the imaging device 130. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor, or the like, or any combination thereof.

In some embodiment, the server 110 may be unnecessary and all or part of the functions of the server 110 may be implemented by other components (e.g., the imaging device 130, the user device 140) of the object measurement system 100. For example, the processing device 112 may be integrated into the imaging device 130, the user device 140, or the optical sensor 160 and the functions (e.g., determining the position information of at least a portion of the object) of the processing device 112 may be implemented by the imaging device 130, the user device 140, or the optical sensor 160.

The network 120 may facilitate exchange of information and/or data for the object measurement system 100. In some embodiments, one or more components (e.g., the server 110, the imaging device 130, the user device 140, the storage device 150, the optical sensor 160) of the object measurement system 100 may transmit information and/or data to other component(s) of the object measurement system 100 via the network 120. For example, the server 110 may obtain the image of the object with the light bar from the imaging device 130 via the network 120. As another example, the server 110 may transmit the position information of at least a portion of the object to the user device 140 via the network 120. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The imaging device 130 may be configured to acquire an image (the "image" herein refers to a single image or a frame of a video). In some embodiments, the imaging device 130 may include a camera 130-1, a video recorder 130-2, an image sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The image sensor 130-3 may include a Charge Coupled Device (CCD), a Complementary Metal Oxide Semiconductor (CMOS), or the like, or any combination thereof. The image acquired by the imaging device 130 may be a two-dimensional image, a three-dimensional image, a four-dimensional image, etc. In some embodiments, the imaging device 130 may include a plurality of components each of which can acquire an image. For example, the imaging device 130 may include a plurality of sub-cameras that can capture images or videos simultaneously. In some embodiments, the imaging device 130 may transmit the acquired image to one or more components (e.g., the server 110, the user device 140, the storage device 150) of the object measurement system 100 via the network 120.

The user device 140 may be configured to receive information and/or data from the server 110, the imaging device 130, the storage device 150, and/or the optical sensor 160 via the network 120. For example, the user device 140 may receive the position information of at least a portion of the object from the server 110. In some embodiments, the user device 140 may process information and/or data received from the server 110, the imaging device 130, the storage device 150, and/or the optical sensor 160 via the network 120. For example, the user device 140 may extract coordinates from the position information of at least a portion of the object. In some embodiments, the user device 140 may provide a user interface via which a user may view information and/or input data and/or instructions to the object measurement system 100. For example, the user may view the coordinates via the user interface. As another example, the user may input an instruction associated with an object measurement parameter via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combination thereof. The display of the user device 140 may include a cathode ray tube (CRT) display, a liquid crystal display (LCD), a light emitting diode (LED) display, a plasma display panel (PDP), a three-dimensional (3D) display, or the like, or a combination thereof. In some embodiments, the user device 140 may be connected to one or more components (e.g., the server 110, the imaging device 130, the storage device 150, the optical sensor 160) of the object measurement system 100 via the network 120.

The storage device 150 may be configured to store data and/or instructions. The data and/or instructions may be obtained from, for example, the server 110, the imaging device 130, the optical sensor 160, and/or any other component of the object measurement system 100. In some embodiments, the storage device 150 may store data and/or instructions that the server 110 may execute or use to perform exemplary methods described in the present disclosure. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the server 110, the imaging device 130, the user device 140, the optical sensor 160) of the object measurement system 100. One or more components of the object measurement system 100 may access the data or instructions stored in the storage device 150 via the network 120. In some embodiments, the storage device 150 may be directly connected to or communicate with one or more components (e.g., the server 110, the imaging device 130, the user device 140, the optical sensor 160) of the object measurement system 100. In some embodiments, the storage device 150 may be part of other components of the object measurement system 100, such as the server 110, the imaging device 130, the user device 140, or the optical sensor 160.

The optical sensor 160 may be configured to generate and irradiate an object via emitting a light beam toward the object. The object may include a biological object and/or a non-biological object. The biological object may include people, an animal, a plant, or the like, or any combination thereof. The non-biological object may include a natural product (e.g., a stone), an artifact (e.g., an industrial component), or the like, or any combination thereof. In some embodiments, the light beam may include a line structured light beam, for example, a laser beam. Correspondingly, the optical sensor 160 may include a laser transmitter configured to generate and irradiate a laser beam on the object. In some embodiments, the optical sensor 160 may be connected to one or more components (e.g., the server 110, the imaging device 130, the user device 140, the storage device 150, the optical sensor 160) of the object measurement system 100 via the network 120. In some embodiments, the optical sensor 160 may be integrated into the imaging device 130.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
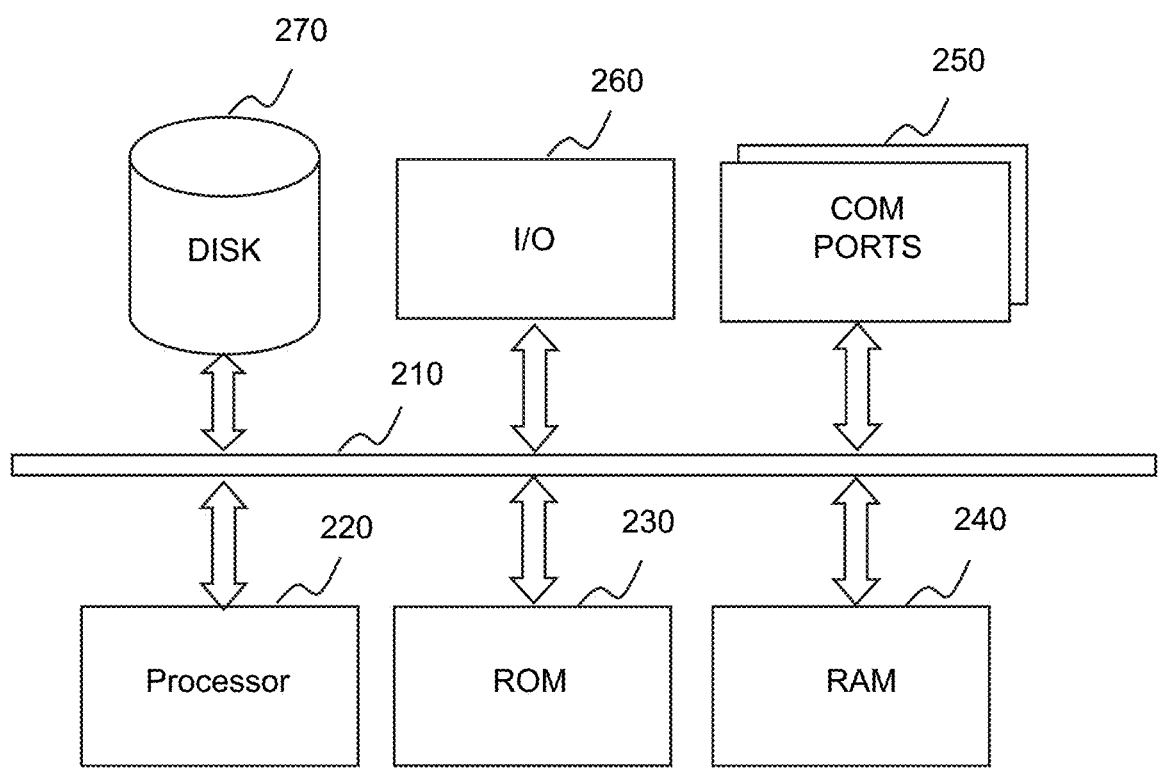
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the object measurement system 100 as described herein. For example, the processing device 112 may be implemented on the computing device 200, via its hardware, software program, firmware, or a combination thereof. Although only one such computer is shown, for convenience, the computer functions relating to object measurement as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
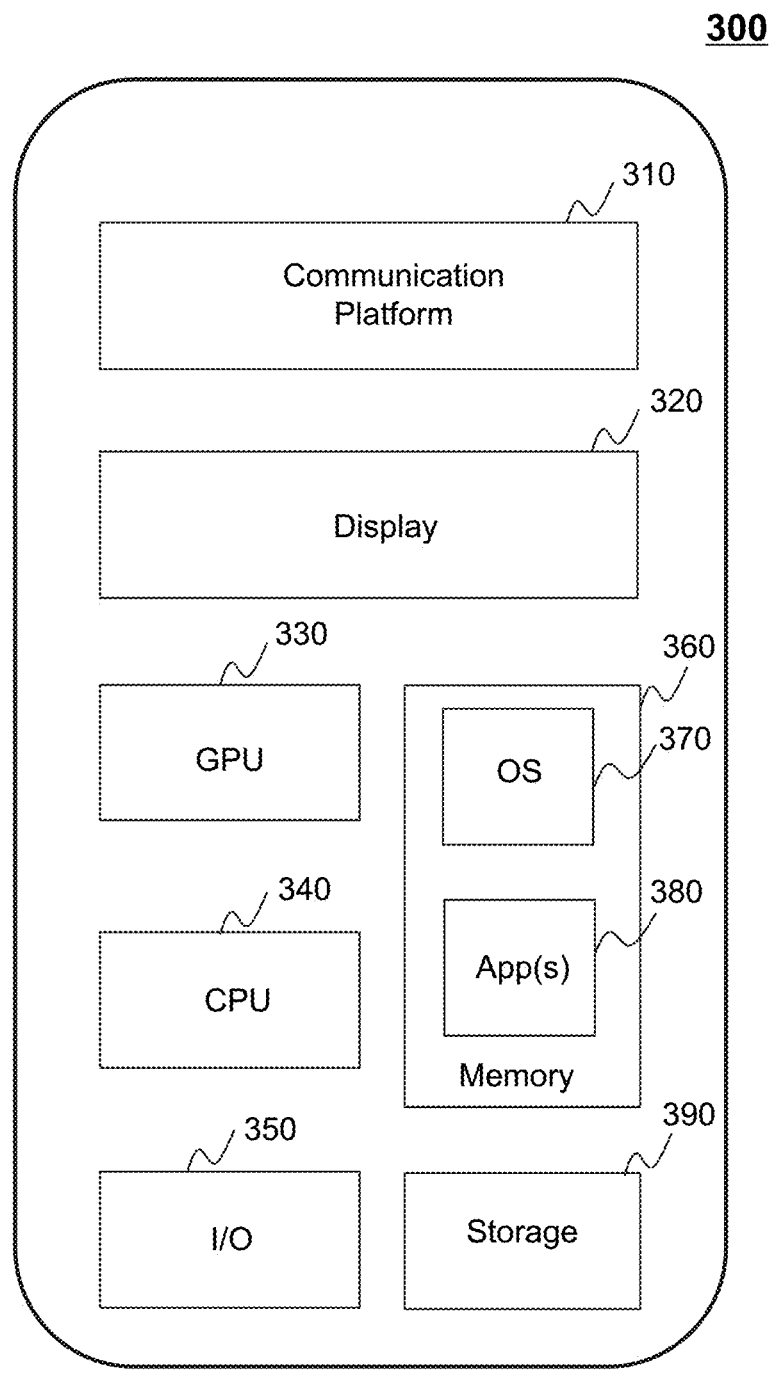
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the user device 140 may be implemented on the terminal device 300 shown in FIG. 3.

As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to object measurement or other information from the processing device 112. User interactions may be achieved via the I/O 350 and provided to the processing device 112 and/or other components of the object measurement system 100 via the network 120.

Figure 4:
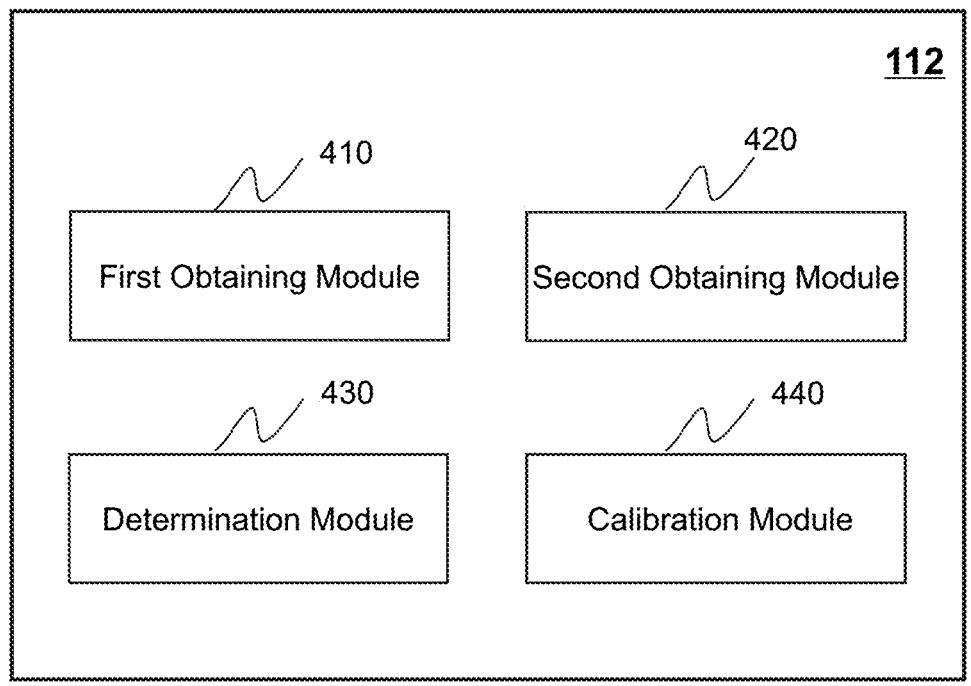
FIG. 4 is a block diagram illustrating an exemplary processing device according to some embodiments of the present disclosure.

FIG. 4 is a block diagram illustrating an exemplary processing device according to some embodiments of the present disclosure. The processing device 112 may include a first obtaining module 410, a second obtaining module 420, a determination module 430, and a calibration module 440.

The first obtaining module 410 may be configured to obtain an image of an object with a light bar acquired by an imaging device (e.g., the imaging device 130). More descriptions regarding the obtaining of the image of the object with the light bar may be found elsewhere in the present disclosure. See, e.g., operation 510 in FIG. 5 and relevant descriptions thereof.

The second obtaining module 420 may be configured to obtain a measurement model. The measurement model may be used to simulate a surface (e.g., a curved surface) formed by the light beam when the light beam is emitted toward the object. More descriptions regarding the obtaining of the measurement model may be found elsewhere in the present disclosure. See, e.g., operation 520 in FIG. 5 and relevant descriptions thereof.

The determination module 430 may be configured to determine position information of at least a portion (e.g., a position point on a surface of the object) of the object based at least in part on the image of the object with the light bar and a measurement model. The determination module 430 may obtain an imaging model of the imaging device (e.g., the imaging device 130). Further, the determination module 430 may determine the position information of at least a portion of the object based on the image of the object with the light bar, the imaging model, and the measurement model. More descriptions regarding the determination of the position information of at least a portion of the object may be found elsewhere in the present disclosure. See, e.g., operation 530 in FIG. 5 and relevant descriptions thereof.

The calibration module 440 may be configured to obtain the measurement model. In some embodiments, the calibration module 440 may obtain a plurality of first calibration images of a calibration object acquired by the imaging device. Each of the plurality of first calibration images may have a light bar formed on the calibration object by the optical sensor. For each of the plurality of first calibration images, the calibration module 440 may determine a center point of a light bar in the first calibration image. Further, the calibration module 440 may obtain a preliminary measurement model. The calibration module 440 may obtain the measurement model by calibrating the preliminary measurement model based on a plurality of center points corresponding to the plurality of first calibration images. More descriptions regarding the obtaining of the measurement model may be found elsewhere in the present disclosure. See, e.g., process 700 in FIG. 7, process 800 in FIG. 8, and relevant descriptions thereof.

The calibration module 440 may be further configured to calibrate the imaging device. In some embodiments, the calibration module 440 may obtain a plurality of second calibration images of a calibration object acquired by the imaging device. For each of the plurality of second calibration images, the calibration module 440 may extract at least one feature point from the second calibration image. Further, the calibration module 440 may obtain position information of the calibration object in a world coordinate system. According to the position information of the calibration object in the world coordinate system and a plurality of feature points corresponding to the plurality of second calibration images, the calibration module 440 may calibrate the imaging device. More descriptions regarding the calibration of the imaging device may be found elsewhere in the present disclosure. See, e.g., process 900 in FIG. 9 and relevant descriptions thereof.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined as a single module, and any one of the modules may be divided into two or more units. For example, the first obtaining module 410 and the second obtaining module 420 may be combined as a single module which may both obtain the image of the object with the light bar and the imaging model of the imaging device. As another example, the calibration module 440 may be divided into a measurement model calibration module configured to obtain the measurement model and an imaging device calibration module configured to obtain the imaging device. In some embodiments, the processing device 120 may include one or more additional modules. For example, the processing device 112 may also include a transmission module configured to transmit signals (e.g., electrical signals, electromagnetic signals) to one or more components (e.g., the imaging device 130, the user device 140) of the object measurement system 100. As another example, the processing device 112 may include a storage module (not shown) used to store information and/or data (e.g., the image of the object with the light bar, the measurement model, the position information of at least a portion of the object) associated with the object measurement.

Figure 5:
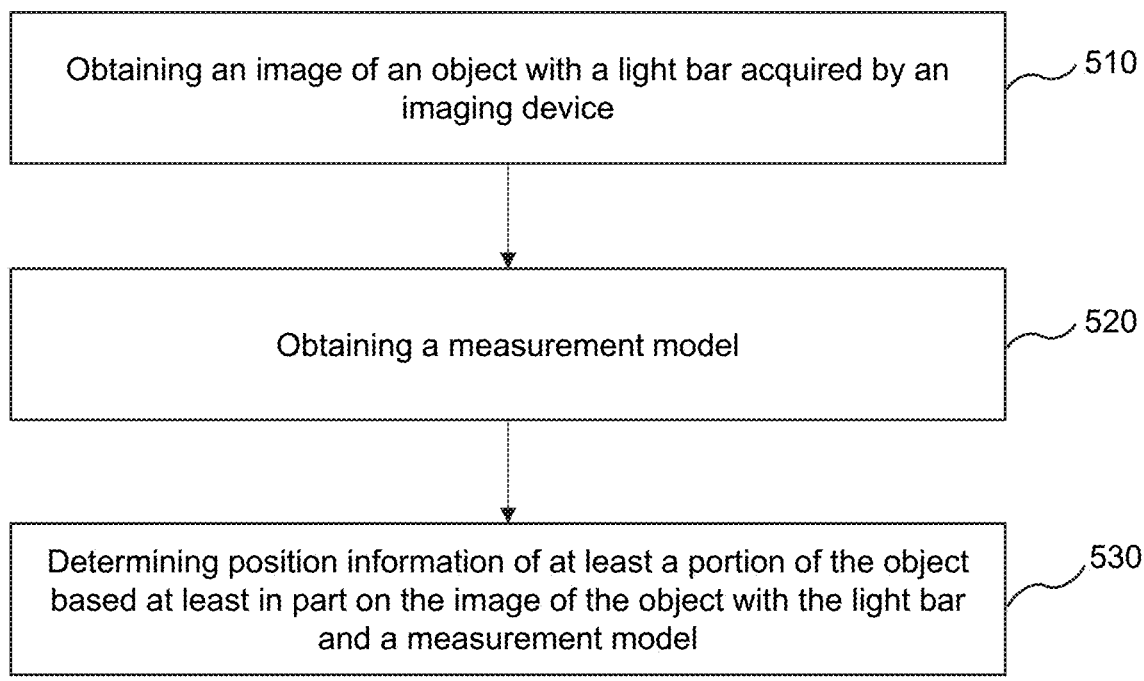
FIG. 5 is a flowchart illustrating an exemplary process for object measurement according to some embodiments of the present disclosure.

FIG. 5 is a flowchart illustrating an exemplary process for object measurement according to some embodiments of the present disclosure. In some embodiments, process 500 may be executed by the object measurement system 100. For example, the process 500 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) and/or an object measurement device 1100 (e.g., one or more components illustrated in FIG. 11) illustrated in FIG. 11 may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 112 (e.g., the first obtaining module 410 illustrated in FIG. 4, an acquisition component 1110 illustrated in FIG. 11) (e.g., the interface circuits of the processor 220) may obtain an image (also referred to as a target image) of an object with a light bar acquired by an imaging device (also referred to as a calibrated camera) (e.g., the imaging device 130).

As described in connection with FIG. 1, the object may include a biological object (e.g., people, an animal, a plant) and/or a non-biological object (e.g., a natural product, an artifact). For example, the object may include an industrial component.

In some embodiments, the processing device 112 may direct an optical sensor (also referred to as a structured light sensor) (e.g., the optical sensor 160) to generate and irradiate a light beam on the object to form the light bar (also referred to as a laser fringe) on the object. The optical sensor may refer to a device used to generate and irradiate a light beam. Merely by way of example, the optical sensor may be a line structured light sensor, for example, a laser sensor, which has advantages of low cost, small size, lightweight, convenience, and flexibility. For example, the optical sensor may be a laser transmitter used to generate and irradiate a laser beam. In some embodiments, the shape of the light bar may be regular or irregular (or deformed). In some embodiments, the shape of the light bar may be determined based on a shape of the object and/or a direction of the light beam illuminating the object. For example, when the light beam illuminates the object from directly above the object and the shape of the object is a rectangle, the shape of the light bar on the object formed by the light beam may be a regular quadrilateral or polygon, for example, a rectangle, a hexagon. As another example, when the light beam illuminates the object from the upper left of the object, the shape of the light bar formed on the object by the light beam may be irregular, for example, a twisted rectangle.

In some embodiments, after the light bar is formed on the object, the processing device 112 may direct the imaging device 130 (e.g., the camera 130-1, the video recorder 130-2, the image sensor 130-3, etc.) to acquire (or capture) the image of the object with the light bar. Merely by way of example, the image may be a frame in a video acquired by the imaging device 130. The processing device 112 may obtain and/or determine the image (i.e., the frame) from the video. For example, the processing device 112 may perform a framing operation on the video to obtain a plurality of frames in the video. The processing device 112 may designate one of the plurality of frames as the image.

In some embodiments, the image of the object with the light bar may be acquired by the imaging device 130 and stored in a storage device (e.g., the storage device 150, the storage device 220, and/or the storage 390). The processing device 112 may obtain the image of the object with the light bar from the storage device via a network (e.g., the network 120). More descriptions regarding the acquisition of the image of the object with the light bar by the imaging device may be found elsewhere in the present disclosure. See, e.g., FIG. 6 and relevant descriptions thereof.

In some embodiments, the processing device 112 may calibrate the imaging device via a calibration process before the imaging device acquires the image. As used herein, the calibration of the imaging device refers to updating values of calibration parameters (e.g., internal parameters, external parameters, etc., as described elsewhere in the present disclosure) and/or types of one or more calibration parameters of the imaging device. For example, the processing device 112 may obtain a plurality of calibration images (also referred to as second calibration images) of a calibration object (also referred to as a calibration target or a calibration board) acquired by the imaging device including a plurality of calibration parameters with preliminary values that are determined in a prior calibration of the imaging device. For each of the plurality of second calibration images, the processing device 112 may extract at least one feature point from the second calibration image. The processing device 112 may obtain position information of the calibration object in a world coordinate system. Further, the processing device 112 may calibrate the imaging device by updating preliminary values of at least a portion of the plurality of calibration parameters based on the position information of the calibration object in the world coordinate system and a plurality of feature points corresponding to the plurality of second calibration images. More descriptions regarding the calibration of the imaging device may be found elsewhere in the present disclosure. See, e.g., FIG. 9 and relevant descriptions thereof.

Figure 11:
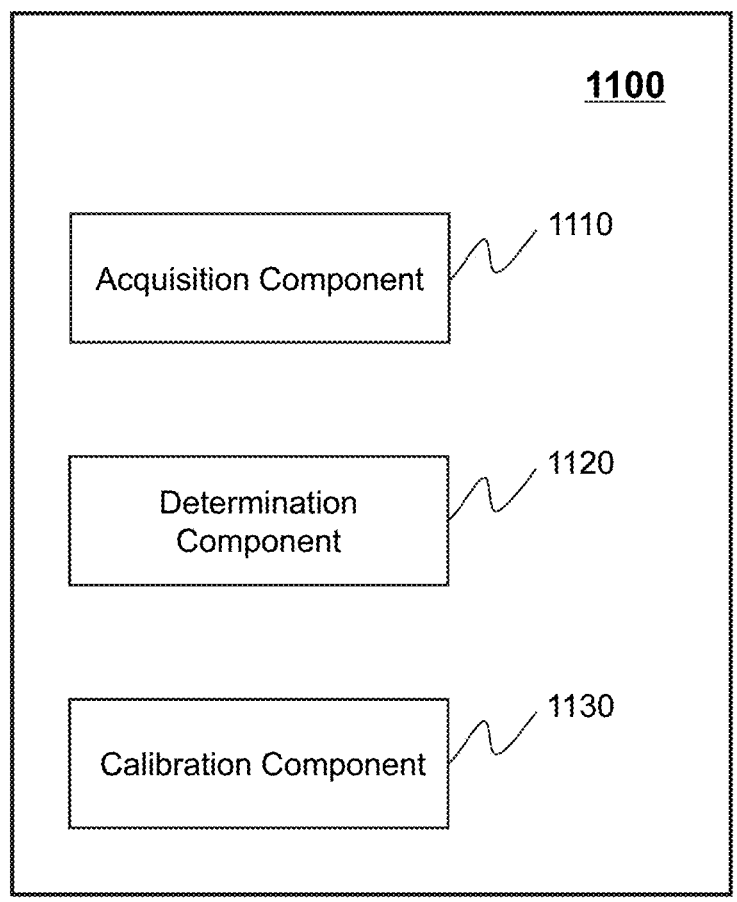
FIG. 11 is a block diagram illustrating an exemplary object measurement according to some embodiments of the present disclosure.

In 520, the processing device 112 (e.g., the second obtaining module 420, the acquisition component 1110 illustrated in FIG. 11) (e.g., the interface circuits of the processor 220) may obtain a measurement model (also referred to as a calibrated curved surface model).

The measurement model may be used to simulate a surface (e.g., a curved surface) formed by the light beam when the light beam is emitted toward the object. In some embodiments, the measurement model may include a surface equation that simulates the curved surface formed by the light beam. In some embodiments, points in the curved surface may have a same or similar distance to the optical sensor.

In some embodiments, the surface equation may include a freeform surface equation that simulates a freeform surface and/or a polynomial equation (e.g., a binomial, a trinomial) that simulates an elementary analytic surface. For example, the measurement model may be represented as a surface equation (1) below:

$$Ax^2+By^2+Cz^2+Dxy+Eyx+Fzx+Gx+Hy+Iz+J=0 \qquad (1),$$

wherein x, y, and z represent coordinates of any point in the curved surface simulated by the surface equation in the world coordinate system or the camera coordinate system, and A, B, C, D, E, F, G, H, I, J represent a plurality of parameters (also referred to as model parameters) of the measurement model.

In some embodiments, the processing device 112 may obtain the measurement model via a model calibration process. For example, the processing device 112 may obtain a plurality of calibration images (also referred to as first calibration images) of a calibration object acquired by the imaging device. Each of the plurality of first calibration images may have a light bar formed on the calibration object by the optical sensor. For each of the plurality of first calibration images, the processing device 112 may determine a center point of a light bar in the first calibration image. The processing device 112 may obtain a preliminary measurement model (also referred to as a prior surface model obtained in a prior calibration). Further, the processing device 112 may obtain the measurement model by calibrating the preliminary measurement model based on a plurality of center points corresponding to the plurality of first calibration images. More descriptions regarding the obtaining of the measurement model may be found elsewhere in the present disclosure. See, e.g., FIG. 7, FIG. 8, and relevant descriptions thereof.

In some embodiments, the measurement model may be previously obtained and stored in the storage device (e.g., the storage device 150, the storage device 220, and/or the storage 390). The processing device 112 may obtain the measurement model from the storage device via the network 120.

In 530, the processing device 112 (e.g., the determination module 430, a determination component 1120 illustrated in FIG. 11) (e.g., the processing circuits of the processor 220) may determine position information of at least a portion (e.g., a position point on a surface of the object) of the object based at least in part on the image of the object with the light bar and a measurement model.

The position information of at least a portion of the object may include coordinates (e.g., three-dimensional coordinates) of at least a portion of the object in the world coordinate system or the camera coordinate system.

The processing device 112 may obtain an imaging model (also referred to as a camera imaging model) of the imaging device (e.g., the imaging device 130). The imaging model may be used to obtain an image of an object by the imaging device. In some embodiments, the imaging model may indicate coordinate systems (e.g., a world coordinate system, a camera coordinate system, a retinal coordinate system, and a pixel coordinate system) and a transform relationship between any two of the coordinate systems. As used herein, the retinal coordinate system may refer to a coordinate system in which physical distances of a pixel to axes of the retinal coordinate system represent a position of the pixel in an image. The pixel coordinate system may refer to a coordinate system in the column and the row of a pixel located in an image represents coordinates of the pixel. In some embodiments, to obtain the image of the object, coordinates of the object may be transformed from the world coordinate system to the camera coordinate system, and then from the camera coordinate system to the retinal coordinate system, and further from the retinal coordinate system to the pixel coordinate system. In some embodiments, to obtain the image of the object, coordinates of the object may be transformed from the world coordinate system to the pixel coordinate system based on a transform relationship between the world coordinate system and the pixel coordinate system.

In some embodiments, the imaging model may include a linear model, a nonlinear model, or a combination thereof. The linear model may include a pinhole imaging model. When the imaging model includes a pinhole imaging model, the imaging model may include a plurality of ray equations used to obtain the image of an object. More descriptions regarding ray equations may be found elsewhere in the present disclosure. See, e.g., FIG. 10 and relevant descriptions thereof.

In some embodiments, the processing device 112 may obtain the imaging model from the imaging device 130 (e.g., the camera 130-1, the video recorder 130-2, the image sensor 130-3, etc.). In some alternative embodiments, the imaging model may be previously obtained and stored in the storage device (e.g., the storage device 150, the storage device 220, and/or the storage 390). The processing device 112 may obtain the imaging model from the storage device via the network 120.

Further, the processing device 112 may determine the position information of at least a portion of the object based on the image of the object with the light bar, the imaging model, and the measurement model. In some embodiments, the processing device 112 may determine a center point of the light bar in the image of the object. Further, the processing device 112 may obtain a ray equation corresponding to the center point of the light bar in the image of the object from the imaging model of the imaging device. According to the ray equation and the surface equation of the measurement model, the processing device 112 may determine coordinates of a point representing the at least a portion of the object. More descriptions regarding the determining of the position information of at least a portion of the object may be found elsewhere in the present disclosure. See, e.g., FIG. 10 and relevant descriptions thereof.

In some embodiments, the light bar may be moved to other positions on the object. For example, the light bar may be moved to other positions by directing the optical sensor (e.g., the optical sensor 160) to change an incident direction of the light beam. Further, the processing device 112 may determine coordinates of other points representing different positions on the object by performing the operations 510-530 multiple times. According to coordinates of a plurality of points representing a plurality of positions on the object, the processing device 112 may determine a three-dimensional shape of the object.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation, a transmitting operation) may be added elsewhere in the process 500. In the storing operation, the processing device 112 may store information and/or data (e.g., the image of the object with the light bar, the measurement model, the position information of at least a portion of the object, the three-dimensional shape of the object) associated with the object measurement in a storage device (e.g., the storage device 150, the storage 220, the storage 390) disclosed elsewhere in the present disclosure. In the transmitting operation, the processing device 112 may transmit the three-dimensional shape of the object to the user device 140. As another example, operation 510 and operation 520 may be combined into a single operation in which the processing device 112 may obtain the image of the object with the light bar and the imaging model of the imaging device. As still another example, operation 520 may be omitted. The processing device 112 may further perform an operation including obtaining the measurement model.

Figure 6:
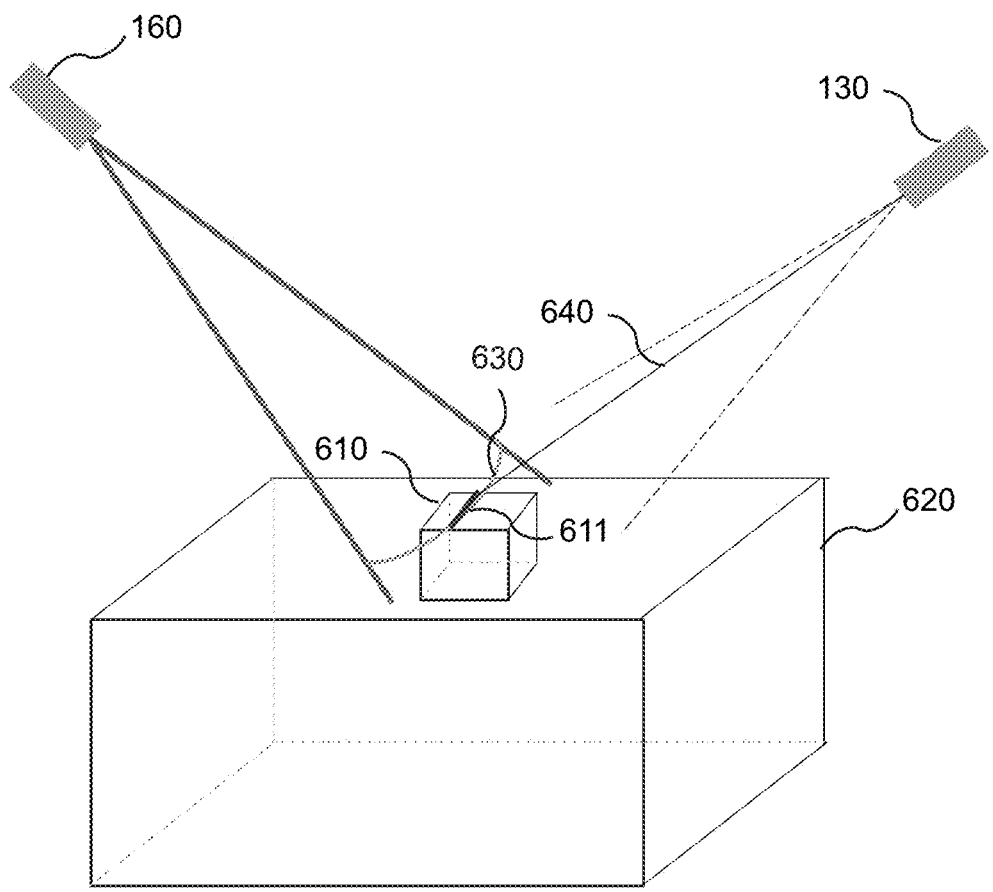
FIG. 6 is a schematic diagram illustrating an exemplary process for obtaining an image of an object with a light bar according to some embodiments of the present disclosure.

FIG. 6 is a schematic diagram illustrating an exemplary process for obtaining an image of an object with a light bar according to some embodiments of the present disclosure. As illustrated in FIG. 6, an object 610 to be measured is placed on a measuring platform 620. An optical sensor (e.g., a laser transmitter) 160 may generate and irradiate a laser beam to the object 610. A cylindrical mirror in the optical sensor 160 may expand the laser beam into a surface 630 (also referred to as a laser surface 630). The laser surface 630 may be simulated by a measurement model. For example, the laser surface 630 may be simulated by a surface equation of the measurement model. The laser surface 630 may intersect with a surface of the object to form a light bar 611, for example, a laser fringe. An imaging device 130 (e.g., a charge-coupled device (CCD)) may capture an image of the object 610 with the light bar 611. The processing device 112 may obtain the image of the object 610 with the light bar 611 from the imaging device 130. According to a center point of the light bar 611, the processing device 112 may determine a ray equation that simulates a projection path 640 (i.e., a ray) of light reflected by the object from the center point to the imaging device. The processing device 112 may determine coordinates of an intersection of the laser surface 630 and the projection path 640 based on the surface equation of the measurement model and the ray equation. The intersection may be a position point in a region where the light bar 611 on the surface of the object 610 is located. Further, the processing device 112 may obtain a plurality of different images of the object 610 by controlling an incident direction of the laser beam, or the movement or rotation of the optical sensor 160. Each of the plurality of different images of the object 610 may have the light bar 611 at a different position of the object. According to the plurality of different images of the object 610, the processing device 112 may determine a three-dimensional shape of the object 610.

In some embodiments, the laser surface 630 formed by the laser beam is assumed to be a plane, and the measurement model used to measure the object 610 may include a model (e.g., a plane model) that can simulate the laser plane. In some embodiments, the laser beam emitted by the optical sensor 160 may be not an absolute straight line, and the laser surface 630 formed by the laser beam may include a curved surface. Therefore, the accuracy of the three-dimensional shape of the object 610 may be poor if the plane model is used to simulate a curved surface formed by the laser beam as a plane. To address the above-mentioned problems, an aspect of the present disclosure provides systems and methods for object measurement with improved measurement accuracy by using the measurement model configured to simulate a curved surface formed by the laser beam.

Figure 7:
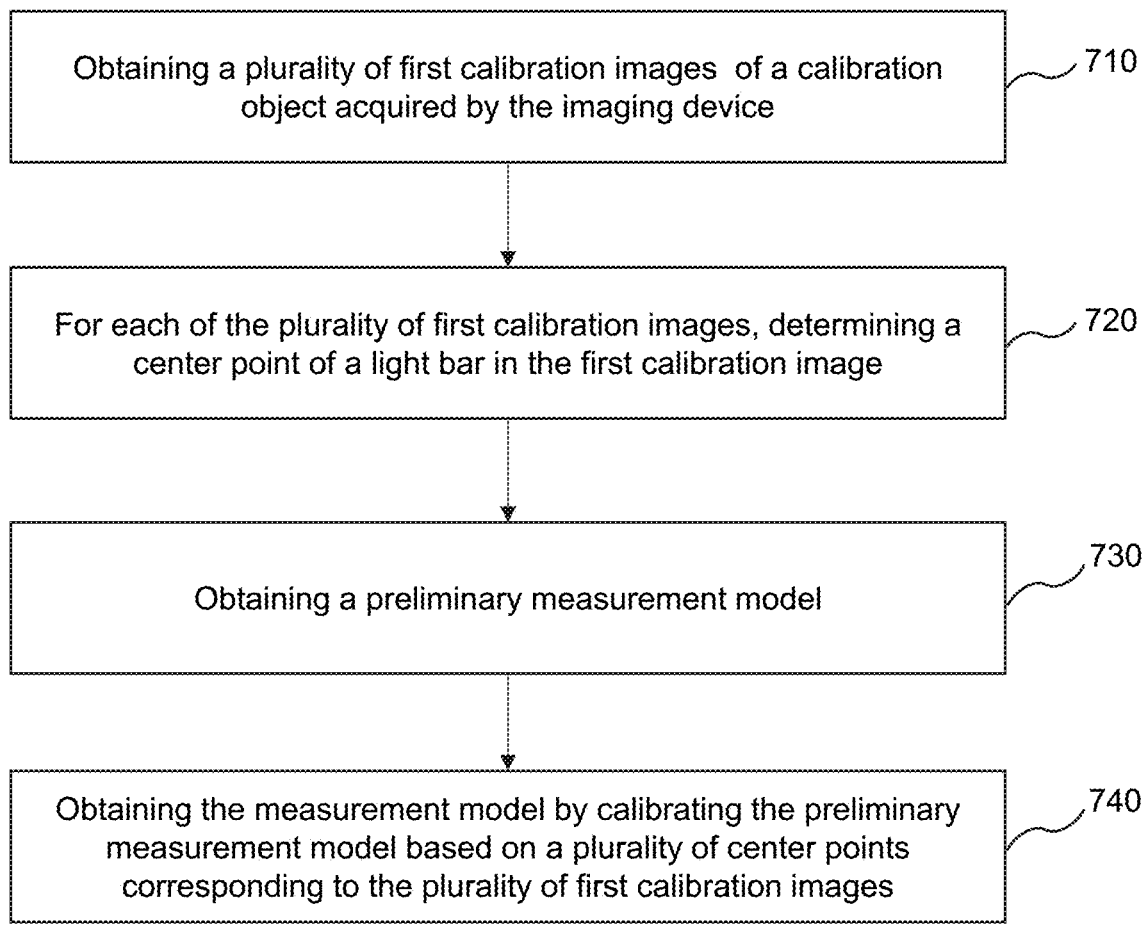
FIG. 7 is a flowchart illustrating an exemplary process for obtaining a measurement model according to some embodiments of the present disclosure.

FIG. 7 is a flowchart illustrating an exemplary process for obtaining a measurement model according to some embodiments of the present disclosure. In some embodiments, process 700 may be executed by the object measurement system 100. For example, the process 700 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) and/or the object measurement device 1100 (e.g., one or more components illustrated in FIG. 11) illustrated in FIG. 11 may execute the set of instructions and may accordingly be directed to perform the process 700. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 7 and described below is not intended to be limiting.

In 710, the processing device 112 (e.g., the calibration module 440 illustrated in FIG. 4, a calibration component 1130 illustrated in FIG. 11) (e.g., the interface circuits of the processor 220) may obtain a plurality of first calibration images (also referred to as laser fringe images) of a calibration object acquired by the imaging device (e.g., the imaging device 130).

The calibration object may refer to a plate (e.g., a flat plate) with a pattern array. In some embodiments, the pattern array may include a plurality of points with fixed spacing. The calibration object may include a checkerboard calibration board, a solid circular array calibration board, etc.

Each of the plurality of first calibration images may have a light bar formed on the calibration object by an optical sensor (e.g., the optical sensor 160). In some embodiments, the processing device 112 may direct the optical sensor 160 to generate and irradiate a light beam to the calibration object to form the light bar on the calibration object. After the light bar is formed on the calibration object, the processing device 112 may direct the imaging device 130 (e.g., the camera 130-1, the video recorder 130-2, the image sensor 130-3, etc.) to acquire (or capture) a first calibration image of the calibration object. Further, a position (e.g., a height, a direction) of the calibration object relative to the imaging device 130 or the optical sensor 160 may be adjusted, and then the processing device 112 may acquire another first calibration image of the calibration object. The plurality of first calibration images may correspond to different positions of the calibration object. Merely by way of example, the processing device 112 may adjust the position of the calibration object relative to the imaging device 130 or the optical sensor 160 by controlling a measuring platform (e.g., the measuring platform 620 illustrated in FIG. 6) used to support the calibration object.

In some embodiments, the plurality of first calibration images may be previously obtained and stored in a storage device (e.g., the storage device 150, the storage device 220, and/or the storage 390). The processing device 112 may obtain the plurality of first calibration images from the storage device via a network (e.g., the network 120).

In 720, for each of the plurality of first calibration images, the processing device 112 (e.g., the calibration module 440, the calibration component 1130 illustrated in FIG. 11) (e.g., the processing circuits of the processor 220) may determine a center point of a light bar (also referred to as a target laser fringe center point) in the first calibration image. In some embodiments, the determination of a target laser fringe center point in the first calibration image may include identifying the target laser fringe center point and/or determining a position of the target laser fringe center point in the first calibration image (e.g., in a pixel coordinate system of the first calibration image).

In some embodiments, the processing device 112 may convert the first calibration image into a grayscale image. The processing device 112 may determine the target laser fringe center point in the first calibration image based on the grayscale image. Merely by way of example, the processing device 112 may convert the first calibration image into the grayscale image using a luminance averaging algorithm. For example, using the luminance averaging algorithm, for each pixel in the first calibration image, the processing device 112 may determine a grayscale value of the pixel by determining an average value of luminance values of three color channels of red (R), green (G), and blue (B) corresponding to the pixel. According to grayscale values (also referred to as grayscale feature information) of pixels in the grayscale image, the processing device 112 may determine a pixel set including a plurality of pixels in the grayscale image. At least a portion of the plurality of pixels in the pixel set may represent the light bar is represented in the image. For example, the processing device 112 may perform a columnar analysis on the grayscale values of pixels in the grayscale image. According to the columnar analysis, the processing device 112 may determine 2%-10% pixels in the grayscale image with higher grayscale values (e.g., exceeding a grayscale threshold) as initial center points (also referred to as candidate laser fringe center points). A set including the initial center points may be regarded as a pixel set. In other words, the initial center points may be the plurality of pixels in the pixel set. Optionally, the processing device 112 may further perform a Gaussian convolution (e.g., a 5*5 two-dimensional Gaussian convolution) on the plurality of pixels in the pixel set, which may remove interference points in the pixel set.

The processing device 112 may determine a target pixel by analyzing the pixel set (or the pixel set that has been performed the Gaussian convolution). For example, the processing device 112 may determine the target pixel by performing a principal component analysis (PCA) on the pixel set. The PCA may have any size window, for example, N*N, wherein N is a positive integer. Specifically, the processing device 112 may determine average values of coordinates of the plurality of pixels in the pixel set in a pixel coordinate system of the first calibration image, and then designate the average values as coordinates of the target pixel. Further, the processing device 112 may designate the target pixel as the center point of the light bar in the first calibration image. The processing device 112 may designate the coordinates of the target pixel in the pixel coordinate system of the first calibration image as coordinates of the center point of the light bar.

In some embodiments, the center point of the light bar may be one of the plurality of pixels in the pixel set. To determine the center point of the light bar from the plurality of pixels in the pixel set, the processing device 112 may determine a normal vector of the center point of the light bar in the first calibration image based on the pixel set. Then the processing device 112 may determine the center point of the light bar based on the normal vector of the center point. Specifically, for each of the plurality of pixels in the pixel set, the processing device 112 may determine a covariance matrix based on position information (e.g., coordinates) of the pixel in the pixel coordinate system of the first calibration image. For example, the processing device 112 may determine a 2*2 covariance matrix of the pixel according to equation (2) below:

$$Cov = \Sigma_{p_i \in p}(p_i - \bar{p}) \times (p_i - \bar{p})^T \quad (2),$$

wherein Coy refers to the covariance matrix, $p_i$ refers to coordinates of the pixel in the pixel coordinate system, $\bar{p}$ refers to average values of coordinates of the plurality of pixels in the pixel set in the pixel coordinate system. The processing device 112 may obtain an eigenvalue and an eigenvector of the covariance matrix. Each pixel in the pixel set may correspond to a covariance matrix. Each covariance matrix may correspond to an eigenvalue and an eigenvector. According to a plurality of eigenvalues and eigenvectors of a plurality of covariance matrixes corresponding to the plurality of the pixels in the pixel set, the processing device 112 may determine the normal vector of the center point of the light bar in the first calibration image. For example, the processing device 112 may determine the maximum eigenvalue among the plurality of eigenvalues of the plurality of covariance matrixes corresponding to the plurality of the pixels. The processing device 112 may designate an eigenvector corresponding to a covariance matrix with the maximum eigenvalue as the normal vector of the center point of the light bar. The normal vector may correspond to a pixel having the covariance matrix with the maximum eigenvalue.

Further, the processing device 112 may determine the center point of the light bar in the first calibration image based on the normal vector. For example, the processing device 112 may designate a pixel in the pixel set corresponding to the normal vector as the center point of the light bar in the first calibration image, and designate coordinates of the pixel corresponding to the normal vector in the pixel coordinate system of the first calibration image as the coordinates of the center point of the light bar. As another example, the processing device 112 may determine at least two reference pixels from the pixel set based on the normal vector. The processing device 112 may determine the center point based on the at least two reference pixels. Specifically, the processing device 112 may determine at least one reference pixel along a direction of the normal vector from the pixel corresponding to the normal vector and at least one reference pixel along an opposite direction of the normal vector from the pixel corresponding to the normal vector. Merely by way of example, the processing device 112 may determine 3 reference pixels along the direction of the normal vector and 3 reference pixels along the opposite direction of the normal vector. The pixel in the pixel set corresponding to the normal vector may be denoted as i, and the reference pixels may be denoted as $p_j$, wherein j=i−3, i−2, i−1, i, i+1, i+2, i+3. According to the at least two reference pixels in the first calibration image, the processing device 112 may determine the center point of the light bar in the first calibration image. For example, the processing device 112 may determine sub-pixel coordinates of the center point of the light bar in the pixel coordinate system based on grayscale values of the at least two reference pixels and position information of the at least two reference pixels in the first calibration image (e.g., coordinates of the at least two reference pixels in the pixel coordinate system) according to equation (3) below:

$$p'_i = \frac{\sum_{j=i-3}^{i+3} g_j \times G_j \times p_j}{\sum_{j=i-3}^{i+3} g_j \times G_j}, \quad (3)$$

wherein $p'_i$ refers to the sub-pixel coordinates of the center point of the light bar in the pixel coordinate system, $g_j$ refers to the grayscale values of the at least two reference pixels, $p_j$ refers to coordinates of the at least two reference pixels in the pixel coordinate system, $G_j$ refers to a 1*7 Gaussian convolution.

In 730, the processing device 112 (e.g., the calibration module 440, the calibration component 1130 illustrated in FIG. 11) (e.g., the interface circuits of the processor 220) may obtain a preliminary measurement model.

In some embodiments, the preliminary measurement model may include a plurality of parameters with preliminary values. The plurality of parameters with preliminary values may be a default setting of the object measurement system 100 or may be adjustable under different situations. For example, the preliminary measurement model may be represented as an equation (4) below:

$$A'x^2+B'y^2+C'z^2+D'xy+E'yx+F'zx+G'x+H'y+I'z+J'=0 \quad (4),$$

wherein A', B', C', D', E', F', G', H', J' represent the plurality of parameters (also referred to as model parameters) of the preliminary measurement model.

In some embodiments, the preliminary measurement model may be previously obtained and stored in the storage device (e.g., the storage device 150, the storage device 220, and/or the storage 390). The processing device 112 may obtain the preliminary measurement model from the storage device via the network 120.

In 740, the processing device 112 (e.g., the calibration module 440, the calibration component 1130 illustrated in FIG. 11) (e.g., the processing circuits of the processor 220) may obtain the measurement model by calibrating the preliminary measurement model based on a plurality of center points corresponding to the plurality of first calibration images.

In some embodiments, the processing device 112 may determine values of the plurality of parameters of the measurement model based on the plurality of center points and the preliminary measurement model. For example, the processing device 112 may determine the values of the plurality of parameters of the measurement model by inputting coordinates or sub-pixel coordinates of the plurality of center points into the preliminary measurement model and performing a fitting operation (e.g., an iterative least squares) on the preliminary measurement model. Further, the processing device 112 may determine the measurement model by updating preliminary values of at least a portion of the plurality of parameters of the preliminary measurement model using the determined values of the plurality of parameters. For example, the processing device 112 may determine the measurement model by replacing the preliminary values of the plurality of parameters (e.g., A', B', C', D', E', F', G', H', I', J') in the equation (4) with the determined values of the plurality of parameters. More descriptions regarding the obtaining of the measurement model may be found elsewhere in the present disclosure. See, e.g., FIG. 8 and relevant descriptions thereof.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 8:
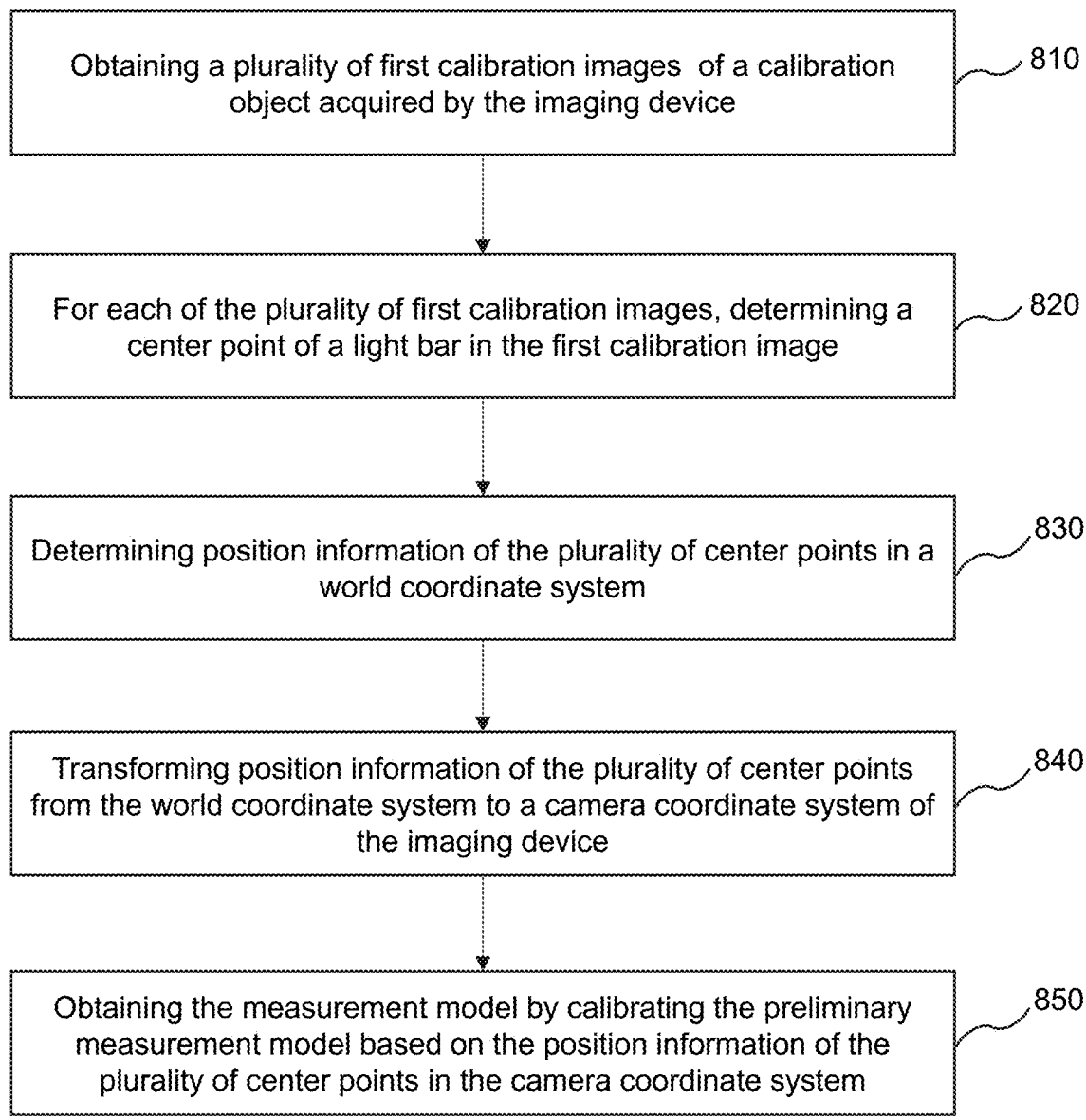
FIG. 8 is a flowchart illustrating an exemplary process for obtaining a measurement model according to some embodiments of the present disclosure.

FIG. 8 is a flowchart illustrating an exemplary process for obtaining a measurement model according to some embodiments of the present disclosure. In some embodiments, process 800 may be executed by the object measurement system 100. For example, the process 800 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) and/or the object measurement device 1100 (e.g., one or more components illustrated in FIG. 11) illustrated in FIG. 11 may execute the set of instructions and may accordingly be directed to perform the process 800. The operations of the illustrated process presented below are intended to be illustrative. In some embodiments, the process 800 may be accomplished with one or more additional operations not described and/or without one or more of the operations discussed. Additionally, the order of the operations of process 800 illustrated in FIG. 8 and described below is not intended to be limiting.

In 810, the processing device 112 (e.g., the calibration module 440, a calibration component 1130 illustrated in FIG. 11) (e.g., the interface circuits of the processor 220) may obtain a plurality of first calibration images of a calibration object acquired by the imaging device. Operation 810 may be performed in a similar manner as operation 710 as described in connection with FIG. 7, and the descriptions thereof are not repeated here.

In 820, for each of the plurality of first calibration images, the processing device 112 (e.g., the calibration module 440, the calibration component 1130 illustrated in FIG. 11) (e.g., the processing circuits of the processor 220) may determine a center point of a light bar in the first calibration image. For example, the processing device 112 may determine the coordinates or sub-pixel coordinates of the center point of the light bar in the pixel coordinate system of the first calibration image. Operation 820 may be performed in a similar manner as operation 720 as described in connection with FIG. 7, and the descriptions thereof are not repeated here.

In 830, the processing device 112 (e.g., the calibration module 440, the calibration component 1130 illustrated in FIG. 11) (e.g., the processing circuits of the processor 220) may determine position information (e.g., the coordinates, the sub-pixel coordinates) of the plurality of center points corresponding to the plurality of first calibration images in a world coordinate system. The plurality of center points corresponding to the plurality of first calibration images may be determined as described in FIG. 7. The position information of a center point in the world coordinate system may include coordinates of the center point denoted by the world coordinate system.

In some embodiments, the coordinates and sub-pixel coordinates of the plurality of center points may be determined in the pixel coordinate system of the plurality of first calibration images as described in FIG. 7, and the pixel coordinate system may be a two-dimensional coordinate system. The measurement model may be a model in a three-dimensional coordinate system, for example, a world coordinate system or a camera coordinate system of the imaging device. The processing device 112 may transform the coordinates or sub-pixel coordinates of the plurality of center points from the pixel coordinate system of the first calibration images to the world coordinate system based on a transform relationship (also referred to as a mapping matrix) between the pixel coordinate system and the world coordinate system. The transform relationship between the pixel coordinate system and the world coordinate system may be determined in the process (e.g., process 900 illustrated in FIG. 9) of calibrating the imaging device.

Further, the processing device 112 may obtain the measurement model by calibrating the preliminary measurement model based on the position information (e.g., the coordinates, the sub-pixel coordinates) of the plurality of center points in the world coordinate system. The obtaining of the measurement model may be performed in a similar manner as that of operation 740 as described in connection with FIG. 7, and the descriptions thereof are not repeated here.

In some embodiments, in order to obtain a measurement model with improved accuracy, the processing device 112 may further perform operations 840 and 850.

In 840, the processing device 112 (e.g., the calibration module 440, the calibration component 1130 illustrated in FIG. 11) (e.g., the processing circuits of the processor 220) may transform the position information (e.g., the coordinates, the sub-pixel coordinates) of the plurality of center points from the world coordinate system to a camera coordinate system of the imaging device.

In some embodiments, the processing device 112 may transform the coordinates and sub-pixel coordinates of the plurality of center points from the world coordinate system to the camera coordinate system based on a transform relationship between the world coordinate system and the camera coordinate system. The transform relationship between the world coordinate system and the camera coordinate system may be determined in the process (e.g., process 900 illustrated in FIG. 9) of obtaining the imaging device.

In 850, the processing device 112 (e.g., the calibration module 440, the calibration component 1130 illustrated in FIG. 11) (e.g., the processing circuits of the processor 220) may obtain the measurement model by calibrating the preliminary measurement model based on the position information (e.g., the coordinates, the sub-pixel coordinates) of the plurality of center points in the camera coordinate system. The obtaining of the measurement model based on the position information of the plurality of center points in the camera coordinate system may be performed in a similar or same manner as the obtaining of the measurement model based on the position information of the plurality of center points in the pixel coordinate system as described in connection with operation 740 in FIG. 7, and the descriptions thereof are not repeated here.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 9:
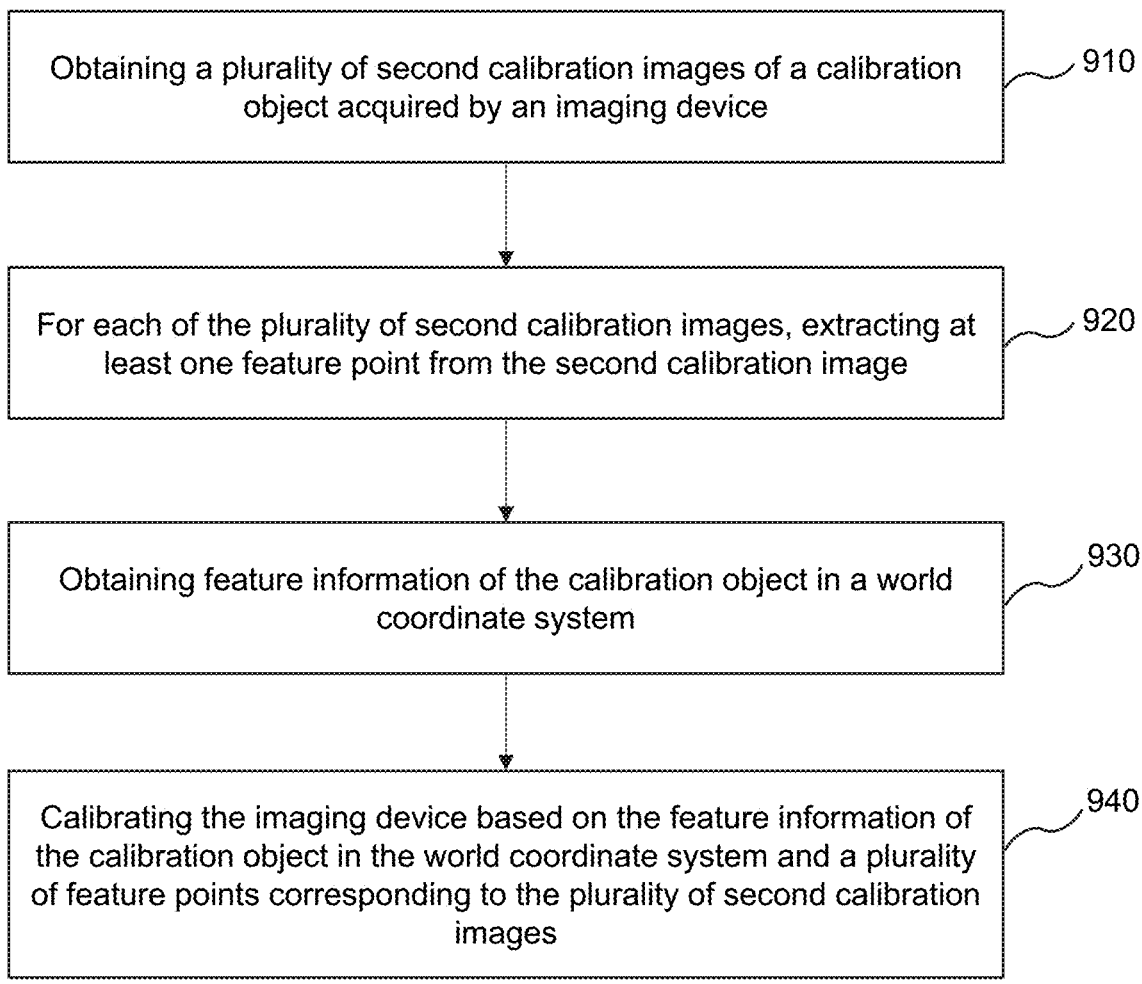
FIG. 9 is a flowchart illustrating an exemplary process for calibrating an imaging device according to some embodiments of the present disclosure.

FIG. 9 is a flowchart illustrating an exemplary process for calibrating an imaging device according to some embodiments of the present disclosure. In some embodiments, process 900 may be executed by the object measurement system 100. For example, the process 900 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) and/or the object measurement device 1100 (e.g., one or more components illustrated in FIG. 11) illustrated in FIG. 11 may execute the set of instructions and may accordingly be directed to perform the process 900. The operations of the illustrated process presented below are intended to be illustrative. In some embodiments, the process 900 may be accomplished with one or more additional operations not described and/or without one or more of the operations discussed. Additionally, the order of the operations of process 900 illustrated in FIG. 9 and described below is not intended to be limiting.

In 910, the processing device 112 (e.g., the calibration module 440, the calibration component 1130 illustrated in FIG. 11) (e.g., the processing circuits of the processor 220) may obtain a plurality of second calibration images of a calibration object acquired by an imaging device including a plurality of calibration parameters with preliminary values.

The processing device 112 may direct the imaging device to acquire (or capture) the plurality of second calibration images of the calibration object. In some embodiments, the processing device 112 may direct the imaging device to shoot the calibration object from different angles to obtain the plurality of second calibration images. Additionally or alternatively, the processing device 112 may direct the imaging device to acquire (or capture) the plurality of second calibration images of the calibration object that is located or placed at different positions. For example, the imaging device may acquire (or capture) a second calibration image of the calibration object at a position. After the calibration object is moved to another position, the imaging device may acquire (or capture) another second calibration image of the calibration object.

In some embodiments, the plurality of second calibration images may be previously obtained and stored in a storage device (e.g., the storage device 150, the storage device 220, and/or the storage 390). The processing device 112 may obtain the plurality of second calibration images from the storage device via a network (e.g., the network 120).

In 920, for each of the plurality of second calibration images, the processing device 112 (e.g., the calibration module 440, the calibration component 1130 illustrated in FIG. 11) (e.g., the processing circuits of the processor 220) may extract at least one feature point from the second calibration image.

The at least one feature point may include, for example, at least one corner point in the second calibration image. As used herein, a corner point may refer to a connecting point of edges represented in the image. In some embodiments, the processing device 112 may extract the at least one feature point (e.g., the corner point) from the second calibration image based on a feature point extraction algorithm, for example, a corner point extraction algorithm. The corner point extraction algorithm may include a Kitchen-Rosenfeld algorithm, a Harris algorithm, a Kanade-Lucas-Tomasi (KLT) tracking algorithm, a small univalue segment assimilating nucleus (SUSAN), or the like, or any combination thereof.

In 930, the processing device 112 (e.g., the calibration module 440, the calibration component 1130 illustrated in FIG. 11) (e.g., the processing circuits of the processor 220) may obtain feature information of the calibration object in a world coordinate system.

The feature information may include a size (e.g., a length, a width, a height), coordinates of the calibration object in the world coordinate system. In some embodiments, the feature information may be previously obtained and stored in the storage device (e.g., the storage device 150, the storage device 220, and/or the storage 390). The processing device 112 may obtain the feature information from the storage device via the network 120.

In 940, the processing device 112 (e.g., the calibration module 440, the calibration component 1130 illustrated in FIG. 11) (e.g., the processing circuits of the processor 220) may calibrate the imaging device based on the feature information of the calibration object in the world coordinate system and a plurality of feature points corresponding to the plurality of second calibration images.

In some embodiments, the imaging device may include a plurality of calibration parameters with preliminary values. The plurality of calibration parameters may include internal parameters, external parameters, a transform relationship between any two of coordinate systems (i.e., a world coordinate system, a camera coordinate system, a retinal coordinate system, and a pixel coordinate system) associated with the imaging device, etc. The internal parameters may refer to parameters related to the characteristics of the imaging device itself. The internal parameters may include, for example, a focal length, sizes, and coordinates of pixels, etc. The external parameters may refer to parameters of the imaging device in the world coordinates system. The external parameters may include, for example, a position, a rotation direction of the imaging device. The transform relationship may include, for example, rotation, translation, zoom, distortion, etc. For example, coordinates of a pixel in the pixel coordinate system may be transformed into the world coordinate system by performing at least one operation of the rotation, translation, zoom, or distortion.

In some embodiments, the preliminary values of the plurality of calibration parameters may be previously obtained (e.g., in a prior calibration) and stored in the storage device (e.g., the storage device 150, the storage device 220, and/or the storage 390). The processing device 112 may obtain the preliminary values of the plurality of calibration parameters from the storage device via the network 120. In some embodiments, the preliminary values of the plurality of calibration parameters may be set by operator or according to a default setting of the system 100.

In some embodiments, the plurality of feature points (e.g., corner points) extracted from the plurality of second calibration images may be in a pixel coordinate system of the plurality of second calibration images. According to the feature information (e.g., the coordinates) of the calibration object in the world coordinate system and the plurality of feature points (e.g., coordinates of the plurality of feature points) in the pixel coordinate system, the processing device 112 may determine a transform relationship between the world coordinate system and the pixel coordinate system associated with the imaging device. For example, the processing device 112 may obtain coordinates of a corner point from the plurality of feature points in the pixel coordinate system and coordinates of a position point on the calibration object corresponding to the corner point from the feature information of the calibration object. Further, the processing device 112 may determine the transform relationship between the world coordinate system and the pixel coordinate system based on the coordinates of a corner point and the coordinates of the position point on the calibration object corresponding to the corner point. The transform relationship between the world coordinate system and the pixel coordinate system may also be referred to as a single mapping matrix. The single mapping matrix may refer to a mapping relationship between pixel coordinates in the pixel coordinate system of the imaging device and coordinates in the world coordinate system. Merely by way of example, the single mapping matrix may be a 3*3 matrix.

According to the determined transform relationship between the world coordinate system and the pixel coordinate system, the processing device 112 may determine values of the plurality of calibration parameters (e.g., internal parameters, external parameters) of the imaging device. The determined transform relationship between the world coordinate system and the pixel coordinate system may be constructed based on values of the plurality of calibration parameters of the imaging device. The processing device 112 may obtain the values of the plurality of calibration parameters of the imaging device from the determined transform relationship. Further, the processing device 112 may calibrate the imaging device by updating the preliminary values of the plurality of calibration parameters using the determined values of the plurality of calibration parameters of the imaging device. For example, the processing device 112 may determine the imaging device by replacing the preliminary values of the plurality of calibration parameters with the determined values of the plurality of calibration parameters of the imaging device.

In some embodiments, after the imaging device is calibrated, the processing device 112 may obtain a transform relationship between any two of coordinate systems (i.e., the world coordinate system, a camera coordinate system, a retinal coordinate system, and a pixel coordinate system) from the imaging device.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 10:
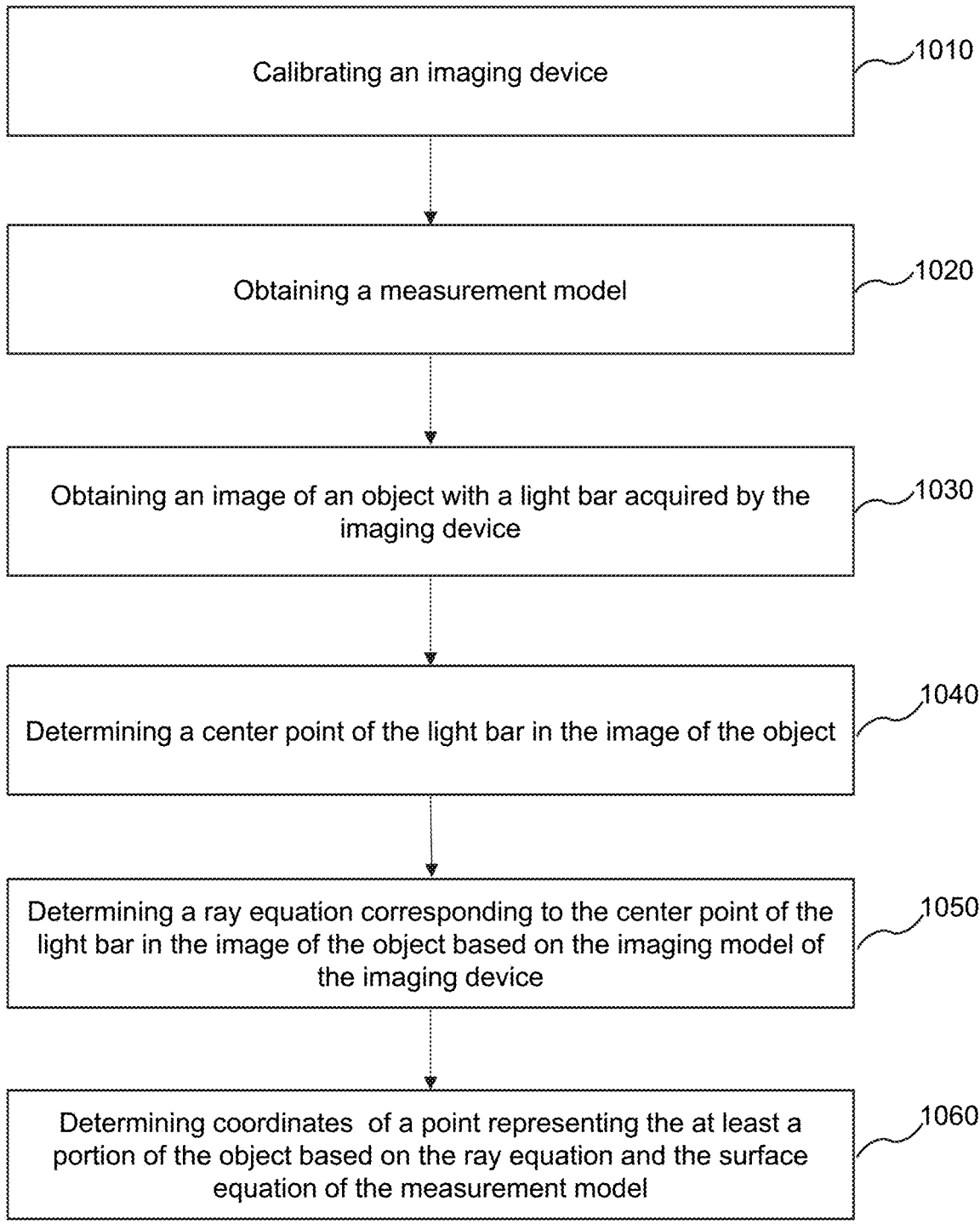
FIG. 10 is a flowchart illustrating an exemplary process for object measurement according to some embodiments of the present disclosure.

FIG. 10 is a flowchart illustrating an exemplary process for object measurement according to some embodiments of the present disclosure. In some embodiments, process 1000 may be executed by the object measurement system 100. For example, the process 1000 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) and/or the object measurement device 1100 (e.g., one or more components illustrated in FIG. 11) illustrated in FIG. 11 may execute the set of instructions and may accordingly be directed to perform the process 1000. The operations of the illustrated process presented below are intended to be illustrative. In some embodiments, the process 1000 may be accomplished with one or more additional operations not described and/or without one or more of the operations discussed. Additionally, the order of the operations of process 1000 illustrated in FIG. 10 and described below is not intended to be limiting.

In 1010, the processing device 112 (e.g., the calibration module 440, the calibration component 1130 illustrated in FIG. 11) (e.g., the processing circuits of the processor 220) may calibrate an imaging device. The calibration of the imaging device may be performed in a similar manner as process 900 as described in connection with FIG. 9, and the descriptions thereof are not repeated here.

1020, the processing device 112 (e.g., the calibration module 440, the calibration component 1130 illustrated in FIG. 11) (e.g., the processing circuits of the processor 220) may obtain a measurement model. The obtaining of the measurement model may be performed in a similar manner as process 700 as described in connection with FIG. 7 or process 800 as described in connection with FIG. 8, and the descriptions thereof are not repeated here. For example, the measurement model may include a surface equation. The surface equation may simulate a curved surface formed by a light beam emitted by an optical sensor (e.g., the optical sensor 160).

In 1030, the processing device 112 (e.g., the first obtaining module 410, the acquisition component 1110 illustrated in FIG. 11) (e.g., the interface circuits of the processor 220) may obtain an image of an object with a light bar acquired by the imaging device. Operation 1030 may be performed in a similar manner as process 510 as described in connection with FIG. 5, and the descriptions thereof are not repeated here.

In 1040, the processing device 112 (e.g., the determination module 430, a determination component 1120 illustrated in FIG. 11) (e.g., the processing circuits of the processor 220) may determine a center point of the light bar in the image of the object. The determining of the center point of the light bar may be performed in a similar manner as that of operation 720 as described in connection with FIG. 7, and the descriptions thereof are not repeated here.

In 1050, the processing device 112 (e.g., the determination module 430, a determination component 1120 illustrated in FIG. 11) (e.g., the processing circuits of the processor 220) may obtain a ray equation corresponding to the center point of the light bar in the image of the object from the imaging model of the imaging device.

The ray equation may simulate a projection path (i.e., a ray) of light from an object to an imaging plane of the imaging device. Each of pixels in the image of the object may correspond to a ray equation that simulates a ray between the pixel and a physical point on the object corresponding to the pixel. For example, the ray equation corresponding to the center point of the light bar in the image of the object may simulate a ray between the center point and a physical point on the object corresponding to the center point. As used herein, a physical point on the object corresponding to the center point refers to that the physical point on the object and the center point represents the same portion or position of the object in the image of the object. In some embodiments, when a pixel in the center point of the light bar is determined, the imaging model of the imaging device may include the ray equation corresponding to the center point of the light bar. The processing device 112 may obtain the ray equation corresponding to the center point of the light bar from the imaging model of the imaging device. The ray equation may be constructed based on at least a portion of the plurality of calibration parameters of the imaging device. Each of pixels in the image may correspond to a ray equation. The ray equation may be a defaulting setting of the system 100. For example, the ray equation may be determined based on the at least a portion of the plurality of calibration parameters of the imaging device. After the plurality of calibration parameters of the imaging device are determined, the ray equation may be determined.

The ray equation corresponding to the center point of the light bar may be denoted using a camera coordinate system of the imaging device. In some embodiments, the ray equation corresponding to the center point of the light bar may be transformed from the camera coordinate system of the imaging device to a world coordinate system based on a transform relationship between the world coordinate system and the camera coordinate system. The transform relationship between the world coordinate system and the camera coordinate system may be determined in the operation of calibrating the imaging device.

In 1060, the processing device 112 (e.g., the determination module 430, a determination component 1120 illustrated in FIG. 11) (e.g., the processing circuits of the processor 220) may determine position information (e.g., coordinates) of a point representing the at least a portion of the object based on the ray equation and measurement model. For example, the processing device 112 may determine the coordinates of the point representing the at least a portion of the object based on the ray equation and the surface equation.

As described in connection with operation 530 in FIG. 5, the surface equation of the measurement model may simulate a curved surface formed by the laser beam when the laser beam emits toward the object to form the light bar on the object. For example, the laser beam with the curved surface may intersect with the surface of the object to form the light bar. In some embodiments, the processing device 112 may determine coordinates of an intersection between a ray simulated by the ray equation corresponding to the center point of the light bar and the curved surface simulated by the surface equation of the measurement model by solving the ray equation and the surface equation. The intersection may include the point representing the at least a portion of the object. In some embodiments, when the ray equation and the measurement model are denoted by the camera coordinate system of the imaging device, the coordinates of the point representing the at least a portion of the object may be coordinates in the camera coordinate system. When the ray equation and the measurement model are denoted by the world coordinate system, the coordinates of the point representing the at least a portion of the object may be coordinates in the world coordinate system. In addition, the coordinates in the camera coordinate system may be transformed from the camera coordinate system to the world coordinate system based on the transform relationship between the world coordinate system and the camera coordinate system.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 11 is a block diagram illustrating an exemplary object measurement device according to some embodiments of the present disclosure. The object measurement device 1100 may include an acquisition component 1110, a determination component 1120, and a calibration component 1130.

The acquisition component 1110 may be configured to obtain an image of an object with a light bar acquired by an imaging device (e.g., the imaging device 130). More descriptions regarding the obtaining of the image of the object with the light bar may be found elsewhere in the present disclosure. See, e.g., operation 510 in FIG. 5 and relevant descriptions thereof.

The acquisition component 1110 may be configured to obtain a measurement model. The measurement model may be used to simulate a surface (e.g., a curved surface) formed by the light beam when the light beam is emitted toward the object. More descriptions regarding the obtaining of the measurement model may be found elsewhere in the present disclosure. See, e.g., operation 520 in FIG. 5 and relevant descriptions thereof.

The determination component 1120 may be configured to determine position information of at least a portion (e.g., a position point on a surface of the object) of the object based at least in part on the image of the object with the light bar and a measurement model. The determination component 1120 may obtain an imaging model of the imaging device (e.g., the imaging device 130). Further, the determination component 1120 may determine the position information of at least a portion of the object based on the image of the object with the light bar, the imaging model, and the measurement model. More descriptions regarding the determination of the position information of at least a portion of the object may be found elsewhere in the present disclosure. See, e.g., operation 530 in FIG. 5 and relevant descriptions thereof.

The calibration component 1130 may be configured to obtain the measurement model. In some embodiments, the calibration component 1130 may obtain a plurality of first calibration images of a calibration object acquired by the imaging device. Each of the plurality of first calibration images may have a light bar formed on the calibration object by the optical sensor. For each of the plurality of first calibration images, the calibration component 1130 may determine a center point of a light bar in the first calibration image. Further, the calibration component 1130 may obtain a preliminary measurement model. The calibration component 1130 may obtain the measurement model by calibrating the preliminary measurement model based on a plurality of center points corresponding to the plurality of first calibration images. More descriptions regarding the obtaining of the measurement model may be found elsewhere in the present disclosure. See, e.g., process 700 in FIG. 7, process 800 in FIG. 8, and relevant descriptions thereof.

The calibration component 1130 may be further configured to calibrate the imaging device. In some embodiments, the calibration component 1130 may obtain a plurality of second calibration images of a calibration object acquired by the imaging device. For each of the plurality of second calibration images, the calibration component 1130 may extract at least one feature point from the second calibration image. Further, the calibration component 1130 may obtain position information of the calibration object in a world coordinate system. According to the position information of the calibration object in the world coordinate system and a plurality of feature points corresponding to the plurality of second calibration images, the calibration component 1130 may calibrate the imaging device. More descriptions regarding the calibration of the imaging device may be found elsewhere in the present disclosure. See, e.g., process 900 in FIG. 9 and relevant descriptions thereof.

The modules in the object measurement device 1100 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

In some embodiments, the present disclosure may also provide a readable storage medium (e.g., a non-volatile storage medium) storing program codes. The program codes may be executed to implement a process (e.g., process 500, process 700, process 800, process 900, process 1000) described elsewhere in the present disclosure.

In some embodiments, the present disclosure may also provide a computer program product including instructions. The instructions may be executed to implement a process (e.g., process 500, process 700, process 800, process 900, process 1000) described elsewhere in the present disclosure. The computer program product may include one or more readable media. A readable medium may include a computer readable signal medium or a readable storage medium.

The readable storage medium may include a system or a device of electrical, magnetic, optical, electromagnetic, infrared, or semiconductor, or any combination thereof. For example, the readable storage medium may include an electrical connection with one or more random wires, a portable disk, a hard disk, a random access memory (RAM), a read-only memory (ROM), an electrically erasable programmable ROM (EEPROM), a flash memory, an optical fiber, a compact disk ROM (CD-ROM), an optical storage device, a magnetic storage device, or the like, or any combination thereof. The readable storage medium may be any tangible medium that contains or stores programs. The programs may be used by a command execution system, device, or the like, or any combination thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or comlocation of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
at least one storage device including a set of instructions; and
at least one processor in communication with the at least one storage device, wherein when executing the set of instructions, the at least one processor is directed to perform operations including:
obtaining an image of an object with a light bar acquired by an imaging device, the light bar being formed by an optical sensor irradiating the object with a light beam;
obtaining a measurement model, the measurement model being configured to simulate a curved surface formed by the light beam;
obtaining an imaging model of the imaging device, the imaging model indicating a transform relationship between coordinate systems associated with the imaging device; and
determining position information of at least a portion of the object based on the image of the object with the light bar, the imaging model, and the measurement model.

2. The system of claim 1, wherein the measurement model is obtained via operations including:
obtaining a plurality of first calibration images of a calibration object acquired by the imaging device, each of the plurality of first calibration images having a light bar formed on the calibration object by the optical sensor;
for each of the plurality of first calibration images, determining a center point of a light bar in the first calibration image;
obtaining a preliminary measurement model; and
obtaining the measurement model by calibrating the preliminary measurement model based on a plurality of center points corresponding to the plurality of first calibration images.

3. The system of claim 2, wherein the determining the center point of the light bar in the first calibration image includes:
converting the first calibration image into a grayscale image;
determining a pixel set including a plurality of pixels in the grayscale image based on grayscale values of pixels in the grayscale image;
determining a target pixel by analyzing the pixel set; and
designating the target pixel as the center point of the light bar in the first calibration image.

4. The system of claim 2, wherein the determining the center point of the light bar in the first calibration image includes:
determining a normal vector of the center point of the light bar in the first calibration image based on a pixel set including a plurality of pixels in a grayscale image corresponding to the first calibration image; and
determining the center point of the light bar in the first calibration image based on the normal vector.

5. The system of claim 4, wherein the determining the normal vector of the center point of the light bar in the first calibration image based on the pixel set includes:
for each of the plurality of pixels in the pixel set,
determining a covariance matrix based on position information of the pixel in a pixel coordinate system of the first calibration image; and
obtaining an eigenvalue and an eigenvector of the covariance matrix; and
determining the normal vector of the center point of the light bar in the first calibration image based on a plurality of eigenvalues and eigenvectors of a plurality of covariance matrixes corresponding to the plurality of the pixels in the pixel set.

6. The system of claim 4, wherein the determining the center point of the light bar in the first calibration image based on the normal vector includes:
determining at least two reference pixels from the pixel set based on the normal vector; and
determining the center point of the light bar in the first calibration image based on the at least two reference pixels in the first calibration image.

7. The system of claim 2, wherein the obtaining the measurement model by calibrating the preliminary measurement model based on the plurality of center points corresponding to the plurality of first calibration images includes:
determining position information of the plurality of center points in a world coordinate system; and
obtaining the measurement model by calibrating the preliminary measurement model based on the position information of the plurality of center points in the world coordinate system.

8. The system of claim 2, wherein the obtaining the measurement model by calibrating the preliminary measurement model based on the plurality of center points corresponding to the plurality of first calibration images includes:
transforming position information of the plurality of center points from a world coordinate system to a camera coordinate system of the imaging device; and
obtaining the measurement model by calibrating the preliminary measurement model based on the position information of the plurality of center points in the camera coordinate system.

9. The system of claim 2, wherein the obtaining the measurement model by calibrating the preliminary measurement model based on the plurality of center points corresponding to the plurality of first calibration images includes:
updating, based on the plurality of center points, preliminary values of a plurality of parameters of the preliminary measurement model.

10. The system of claim 1, wherein the imaging device is calibrated via operations including:
obtaining a plurality of second calibration images of a calibration object acquired by the imaging device;
for each of the plurality of second calibration images, extracting at least one feature point from the second calibration image;

obtaining feature information of the calibration object in a world coordinate system; and calibrating the imaging device based on the feature information of the calibration object in the world coordinate system and a plurality of feature points corresponding to the plurality of second calibration images.

11. The system of claim 1, wherein the determining the position information of at least a portion of the object based on the image of the object with the light bar, the imaging model, and the measurement model includes:

determining a center point of the light bar in the image of the object;

obtaining, from the imaging model of the imaging device, a ray equation corresponding to the center point of the light bar in the image of the object; and determining, based on the ray equation and a surface equation of the measurement model, coordinates of a point representing the at least the portion of the object.

12. The system of claim 11, wherein the surface equation includes at least one of a freeform surface equation that simulates a freeform surface or a polynomial equation that simulates an elementary analytic surface.

13. A method implemented on a computing device including at least one processor, at least one storage medium, and a communication platform connected to a network, the method comprising:

obtaining an image of an object with a light bar acquired by an imaging device, the light bar being formed by an optical sensor irradiating the object with a light beam;

obtaining a measurement model, the measurement model being configured to simulate a curved surface formed by the light beam;

obtaining an imaging model of the imaging device, the imaging model indicating a transform relationship between coordinate systems associated with the imaging device; and determining position information of at least a portion of the object based on the image of the object with the light bar, the imaging model, and the measurement model.

14. The method of claim 13, wherein the measurement model is obtained via operations including:

obtaining a plurality of first calibration images of a calibration object acquired by the imaging device, each of the plurality of first calibration images having a light bar formed on the calibration object by the optical sensor;

for each of the plurality of first calibration images, determining a center point of a light bar in the first calibration image;

obtaining a preliminary measurement model; and obtaining the measurement model by calibrating the preliminary measurement model based on a plurality of center points corresponding to the plurality of first calibration images.

15. The method of claim 14, wherein the determining center point of the light bar in the first calibration image includes:

converting the first calibration image into a grayscale image;

determining a pixel set including a plurality of pixels in the grayscale image based on grayscale values of pixels in the grayscale image;

determining a target pixel by analyzing the pixel set; and designating the target pixel as the center point of the light bar in the first calibration image.

16. The method of claim 14, wherein the determining the center point of the light bar in the first calibration image includes:

determining a normal vector of the center point of the light bar in the first calibration image based on a pixel set including a plurality of pixels in a grayscale image corresponding to the first calibration image; and determining the center point of the light bar in the first calibration image based on the normal vector.

17. The method of claim 16, wherein the determining the normal vector of the center point of the light bar in the first calibration image based on the pixel set includes:

for each of the plurality of pixels in the pixel set,
determining a covariance matrix based on position information of the pixel in a pixel coordinate system of the first calibration image; and obtaining an eigenvalue and an eigenvector of the covariance matrix; and determining the normal vector of the center point of the light bar in the first calibration image based on a plurality of eigenvalues and eigenvectors of a plurality of covariance matrixes corresponding to the plurality of the pixels in the pixel set.

18. The method of claim 16, wherein the determining the center point of the light bar in the first calibration image based on the normal vector includes:

determining at least two reference pixels from the pixel set based on the normal vector; and determining the center point of the light bar in the first calibration image based on the at least two reference pixels in the first calibration image.

19. A non-transitory computer readable medium, comprising executable instructions that, when executed by at least one processor, direct the at least one processor to perform a method, the method comprising:

obtaining an image of an object with a light bar acquired by an imaging device, the light bar being formed by an optical sensor irradiating the object with a light beam;

obtaining a measurement model, the measurement model being configured to simulate a curved surface formed by the light beam;

obtaining an imaging model of the imaging device, the imaging model indicating a transform relationship between coordinate systems associated with the imaging device; and determining position information of at least a portion of the object based on the image of the object with the light bar, the imaging model, and the measurement model.

* * * * *